US010673236B2

(12) United States Patent
Divan et al.

(10) Patent No.: US 10,673,236 B2
(45) Date of Patent: Jun. 2, 2020

(54) CONTROLLING DEMAND AND ENERGY THROUGH PHOTOVOLTAIC INVERTERS DELIVERING VARS

(71) Applicant: Varentec, Inc., Santa Clara, CA (US)

(72) Inventors: Deepakraj Divan, Santa Clara, CA (US); Rohit Moghe, Santa Clara, CA (US)

(73) Assignee: Varentec, Inc., Santa Clara, CA (US)

( * ) Notice: Subject to any disclaimer, the term of this patent is extended or adjusted under 35 U.S.C. 154(b) by 490 days.

(21) Appl. No.: 14/964,524

(22) Filed: Dec. 9, 2015

(65) Prior Publication Data

US 2016/0094034 A1    Mar. 31, 2016

Related U.S. Application Data

(63) Continuation-in-part of application No. 14/695,880, filed on Apr. 24, 2015.

(60) Provisional application No. 61/983,634, filed on Apr. 24, 2014.

(51) Int. Cl.
*H02J 3/18* (2006.01)
*H02J 3/38* (2006.01)
*H02M 7/42* (2006.01)

(52) U.S. Cl.
CPC .............. *H02J 3/18* (2013.01); *H02J 3/383* (2013.01); *H02M 7/42* (2013.01); *Y02E 10/563* (2013.01); *Y02E 40/30* (2013.01)

(58) Field of Classification Search
CPC ... H02J 3/18; H02J 3/383; H02M 7/42; Y02E 10/563; Y02E 40/30
See application file for complete search history.

(56) References Cited

U.S. PATENT DOCUMENTS

| 5,136,233 A | 8/1992 | Klinkenberg et al. |
| 5,422,561 A * | 6/1995 | Williams ............... H02J 3/1821 307/31 |
| 5,541,498 A | 7/1996 | Beckwith |
| 2002/0013689 A1 * | 1/2002 | Hunton .................. H02J 3/008 703/18 |

(Continued)

FOREIGN PATENT DOCUMENTS

| NO | 2013065114 A1 | 5/2013 |
| WO | 2007060328 A1 | 5/2007 |
| WO | 2013065114 A1 | 5/2013 |

OTHER PUBLICATIONS

"Explaining Different Types of Transformers", GALCO, p. 2. 2018 (Year: 2018).*

(Continued)

*Primary Examiner* — Santosh R Poudel
(74) *Attorney, Agent, or Firm* — Sheppard Mullin Richter & Hampton LLP

(57) ABSTRACT

By virtue of the ability to vary local load via inverter (e.g., solar PV inverter) volt-ampere reactive power (VAR) injection, local demand and energy consumption can be controlled at a system level. Utilities that provide solar PV systems to consumers can leverage this ability to reduce the purchase of high cost energy. Moreover, revenue for such utilities can be maximized. For example, such localized voltage and VAR control allow for precise control to achieve, e.g., plus or minus about two percent of kW and kWHr of power consumed at a node.

8 Claims, 26 Drawing Sheets

(56) References Cited

U.S. PATENT DOCUMENTS

| | | |
|---|---|---|
| 2003/0076075 A1 | 4/2003 | Ma et al. |
| 2004/0010478 A1 | 1/2004 | Peljto et al. |
| 2009/0024255 A1 | 1/2009 | Penzenstadler |
| 2010/0067271 A1 | 3/2010 | Garces et al. |
| 2010/0327657 A1 | 12/2010 | Kuran |
| 2014/0039711 A1 | 12/2010 | Divan et al. |
| 2011/0196546 A1* | 8/2011 | Muller .................. H02J 3/383 |
| | | 700/295 |
| 2011/0204717 A1 | 8/2011 | Shaffer |
| 2012/0150358 A1 | 6/2012 | Beck |
| 2012/0153888 A1* | 6/2012 | Jung .................. H01M 10/465 |
| | | 320/101 |
| 2012/0191262 A1* | 7/2012 | Marcus ............. G06Q 30/0202 |
| | | 700/286 |
| 2013/0024040 A1 | 1/2013 | Vukojevic et al. |
| 2013/0030599 A1 | 1/2013 | Milosevic et al. |
| 2013/0096724 A1 | 4/2013 | Divan et al. |
| 2013/0138260 A1 | 5/2013 | Divan et al. |
| 2013/0168963 A1 | 7/2013 | Garcia |
| 2013/0173078 A1 | 7/2013 | Divan et al. |
| 2013/0293021 A1* | 11/2013 | Varma ...................... H02J 3/18 |
| | | 307/75 |
| 2014/0046500 A1* | 2/2014 | Varma ...................... G05F 1/66 |
| | | 700/298 |
| 2014/0103888 A1 | 4/2014 | Divan et al. |
| 2014/0176090 A1 | 6/2014 | Harjeet et al. |
| 2014/0249688 A1* | 9/2014 | Ansari ..................... H02J 3/46 |
| | | 700/297 |
| 2014/0288725 A1 | 9/2014 | Itaya |
| 2014/0350742 A1 | 11/2014 | Matan et al. |
| 2015/0311718 A1 | 10/2015 | Divan et al. |
| 2016/0204609 A1 | 7/2016 | Tyler et al. |

OTHER PUBLICATIONS

Patent Cooperation Treaty, International Search Report for PCT/US2015/027590, dated Jul. 23, 2015, pp. 1-2.

Patent Cooperation Treaty, International Search Report for PCT/US2016/065009, dated Apr. 7, 2017, pp. 1-4.

Federal Energy Regulatory Commission, Payment for Reactive Power, Commission Staff Report AD 14-7, Apr. 22, 2014, pp. 1-48.

St. John, Jeff, 'Varentec Launches the Distributed, Voltage-Correcting Grid Sensor, Greeentech, Media (2013).

Extended European Search Report and Written Opinion in European Patent Application No. 16873651.0, dated Jun. 28, 2019.

Bhatt, Ravi et al., "Grid frequency and voltage support using PV systems with energy storage," North American Power Symposium (NAPS), 2011, IEEE, (Aug. 4, 2011), doi:10.1109/NAPS.2011.6025112, ISBN 978-1-4577-0417-8, pp. 1-6, XP031940643 [I] 1-20 (Abstract Only).

* cited by examiner

With Grid Edge Control

No Grid Edge Control

CONTROLLING DEMAND AND ENERGY THROUGH PHOTOVOLTAIC INVERTERS DELIVERING VARS

CROSS-REFERENCE TO RELATED APPLICATIONS

The present application is a continuation-in-part of U.S. patent application Ser. No. 14/695,880 filed Apr. 24, 2015, which in turn claims priority from U.S. Provisional Patent Application No. 61/983,634 filed Apr. 24, 2014, both of which are incorporated herein by reference in their entirety.

FIELD

Various embodiments generally relate to voltage and volt-ampere reactive power (VAR) management along transmission and distribution network. More particularly, various embodiments are related to controlling demand and energy through the use of photovoltaic inverters that deliver VARs.

DESCRIPTION OF THE RELATED ART

A primary purpose of voltage control is maintaining acceptable voltage (e.g. in the United States, as per the American National Standards Institute (ANSI) band, the voltage at the service entrant is to be maintained between 120 volts plus or minus five percent) at the service entrance of customers served by a feeder under all possible operating conditions. Electric utilities traditionally maintain distribution system voltage within the acceptable range using transformers with moveable taps that permit voltage adjustments under load. Other methods include de-energized tap changers (DETC) where the transformers are de-energized for changing the tap setting and then re-energized once the tap is changed. When utilizing the DETC method, the tap remains fixed once changed and the voltage is not actively regulated. Voltage regulators located in substations and on the lines, as well as substation transformers are commonly used for voltage control purposes. These transformers can be referred to as Load Tap Changers (LTCs) and are equipped with a voltage-regulating controller that determines whether to raise or lower the transformer tap settings or leave the tap setting unchanged based on "local" voltage and load measurements.

An optimal strategy for distribution feeder design and operation is to establish acceptable voltage conditions for all customers while meeting certain set objectives which could be reducing energy consumption, reducing peak demand, reducing line losses on the system (in other words maximizing efficiency), reducing voltage loss across the feeder and stabilizing the voltage throughout the feeder. The voltage profile along the distribution feeder and the flow of VARs on the feeder are typically maintained by a combination of voltage regulators and switched capacitor banks installed at various locations on the feeder and in its associated substation. Each voltage regulator includes a controller that raises or lowers the voltage regulator tap position in response to local (at the device) current, voltage, time of day, or temperature measurements. Similarly, each capacitor bank includes a controller that switches the bank on or off in response to its local measurements. These capacitor banks serve as a source of reactive power that the electric utility can position at any point on the feeder. Installing capacitor banks at strategic locations on the feeder reduces the amount of reactive power supplied by the transmission system, reduces the flow of VARs from the substation to the loads, reduces the current flowing from the transmission and distribution system to serve a given load, reduces the associated electrical losses, and increases the voltage at the point of the capacitor.

Traditionally, feeder voltage regulators and switched capacitor banks are operated as completely independent (stand-alone) devices, with no direct coordination between the individual controllers. This may allow for maintaining coarse voltage control and reactive power flow near the controllers, but as these technologies apply to the primary side (medium voltage side), are electromechanical, act slowly, and are sparsely deployed, they provide highly sub-optimal performance for meeting feeder level objectives such as reduction in energy, reduction in demand, etc. Smart distribution voltage control achieves other operating objectives in addition to the primary function of maintaining acceptable voltage. A common smart distribution voltage control function may be referred to as Conservation Voltage Reduction (CVR). With CVR, the system intentionally lowers the voltage on the distribution feeder to the lowest acceptable voltage value to achieve valuable benefits to the electric utility and consumers, such as reduced demand and energy consumption. Smart VAR control uses complex algorithms to control switched capacitors, feeder regulators and LTCs to control VAR flow and feeder voltage as feeder conditions vary during the day. However, rather than basing the control actions solely on local measurements, the Volt-VAR control function bases switching decisions on measurements taken at the substation and/or end of the feeder, where total VAR flow and/or voltage is readily observable. As an example, when it is detected that the VAR flow to the feeder is excessive at the substation, remote control facilities are used to operate the switched capacitor banks as needed. Still other techniques attempt to (relying on meters) implement voltage and VAR optimization by identifying the "weakest" voltage nodes, and adjusting LTCs and capacitor banks accordingly to achieve smart distribution voltage control.

However, at least one drawback for each of the above-noted schemes is their reliance on corrections on the primary side of the distribution transformer. A substantial, and variable part of the reactive voltage drop occurs across the transformer reactance. This is either never sensed, or remains uncompensated for without any secondary side fast and dynamic Volt-VAR control devices. Moreover, medium voltage assets (i.e., LTCs and capacitor banks) are electromechanical in nature and have limited life. In addition, both LTCs and capacitor banks can switch only a few times a day, typically 2-10 times a day. The actuation process takes anywhere from 30 seconds to 15 minutes depending on the settings of the asset (LTC, capacitor bank, etc.). Further, capacitor banks once switched off need several minutes of discharge time before they can be re-engaged. Due to all these limitations of primary side asset, voltage VAR control achievable through the control of primary side assets is not only sub-optimal, but is also severely limited. Furthermore, with distributed generation (DG) such as solar photovoltaic (PV) systems, being introduced on the grid at an ever increasing rate, the efficacy of these sparsely deployed primary assets is highly diminished, and as DG and electric vehicles (EVs) increase, the load distribution and dynamics will change progressively. Consequently, it would require re-visiting the placement of the primary side assets more frequently which would essentially increase operating expenditure for utilities.

The increase in introduction of solar power can be attributed to an increase in the number of solar power utilities being formed to facilitate broad deployment of distributed energy technologies such as rooftop solar PV systems. For example, policies in some countries provide subsidies and incentivize the installation of residential and commercial solar PV systems through two mechanisms namely, feed-in tariffs (FIT) and net energy metering (NEM).

BRIEF SUMMARY OF THE DISCLOSURE

In accordance with one embodiment, a computer-implemented method for voltage and volt ampere reactive (VAR) control of a power system comprises: determining net power drawn at a load; determining a first price associated with power provided by a first utility; and determining a second price associated with power provided by at least a second utility. The computer-implemented method further comprises at least one of injecting and absorbing VARs to increase or decrease energy consumption based upon a comparison between the determined net power drawn at the load, the first price, and the second price.

In accordance with another embodiments, a system, comprises at least one load distributed along and receiving power from a feeder of a power grid. Moreover, the system comprises a solar power system installed at the at least one load, wherein the solar power system generates solar power, and wherein an inverter of the solar power system is operative to at least one of inject and absorb VARs to increase energy consumption based upon a comparison between a determined net power drawn at the at least one load and a contracted price for the received power and a current market price for power.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 1:
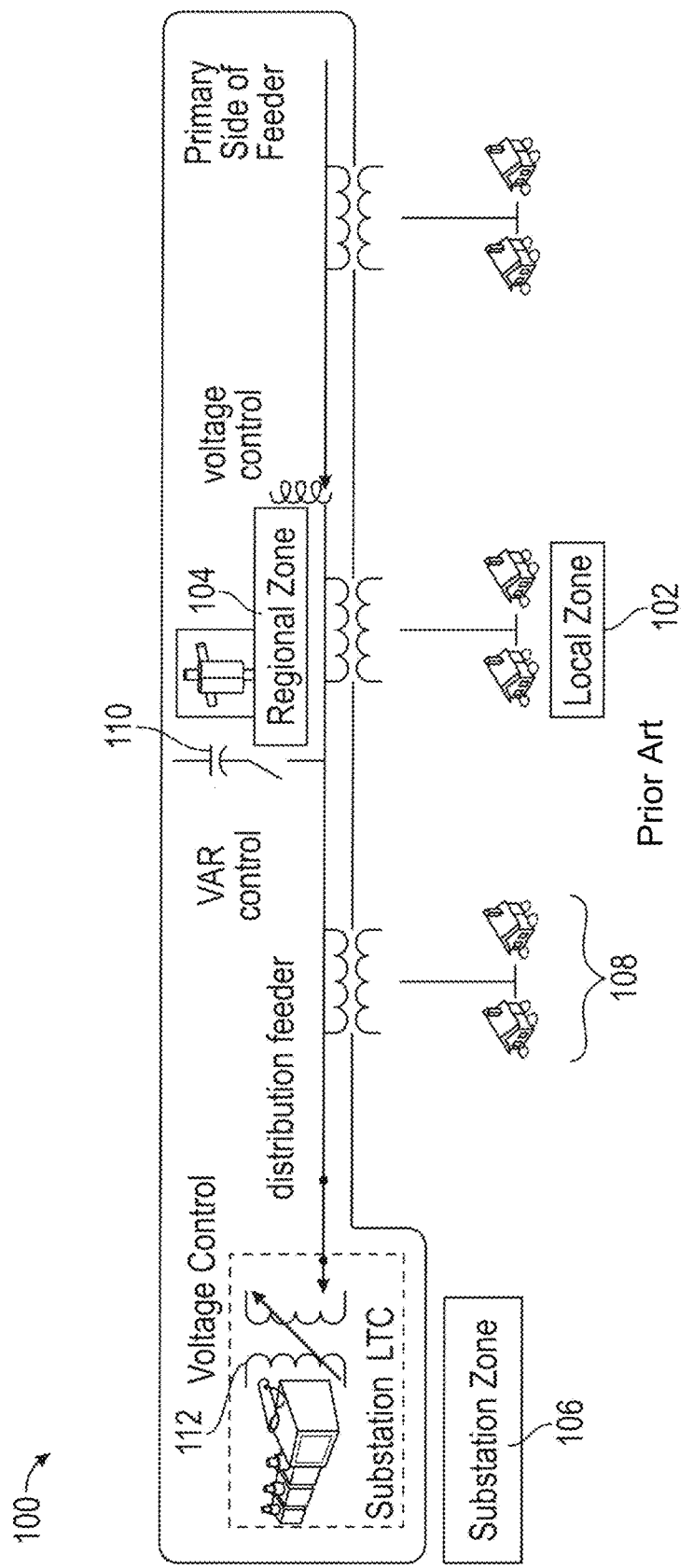
FIG. 1 illustrates an example power system using a conventional voltage and VAR control scheme.

As alluded to previously, conventional voltage and VAR control relies on assets that are on the primary side of the feeder and assumes an averaged model for the devices. FIG. 1 illustrates an example power system 100 that is utilizing conventional voltage and VAR control. In the illustrated example, the power system 100 may include a local zone 102, a regional zone 104, and a substation zone 106. The local zone 102 may include customer loads 108 that may be highly variable and stochastic. As can be appreciated, there is no voltage control in the local zone 102.

The regional zone 104 may include the aforementioned switched capacitor banks 110 that provide VAR control. The control provided by the switched capacitor banks 110 may be slow and "lumpy." For example, the switched capacitor banks 110 may be switched only, e.g., two to three times a day. Further, the response time of a capacitor bank can be on the order of several seconds to minutes. Moreover, they cannot compensate for the voltage drop across distribution transformers that result in significant amounts of volatility at the grid edge. Moreover, problems can occur with, e.g., long rural circuits with voltages that can tend to fall well below the minimum voltage limits, circuits with large amounts of solar power injected therein which can cause voltages to rise and fall with the overhead passage of the sun and/or clouds. The regional zone 104 may contain line voltage regulators (LVR) for voltage control. LVRs suffer from similar problems of slow response and limited number of switchings per day.

The substation zone 106 may include LTCs, e.g., LTC 112, that provide voltage control. Voltage, current, and power flows may be measured and fed to a supervisory control and data acquisition ("SCADA") system(s) (not shown). Performance of the electric grid (e.g., losses, generation, demand, etc.) may be optimized according to a modeling and measurement-based optimization that drives the settings utilized for the LTCs, LVRs and capacitor banks.

It should be understood that the range of control for conventional voltage and VAR control in a power system, such as power system 100, tends to be limited and typically centralized. For example, and with regard to the substation zone 106, controlling the setting of LTC 112 can allow control of the feeder voltage to be achieved with a control range of approximately plus or minus eight percent. A one percent drop in voltage, for example, may reduce power by about 1 percent and capacitor bank VARs by about two percent. Accordingly, in the regional zone 104, capacitor bank 110 can inject VARs resulting in an increase in voltage on the primary side of the feeder. The voltage (240 Volt base) may be increased by about one to two volts for a typical feeder of 300 kVARs. In the local zone 102, both the LTC 112 and the switched capacitor bank 110 can regulate voltage for all connected loads (e.g., houses 108) simultaneously. Nevertheless, the LTC 112 and the switched capacitor bank 110 cannot manage different actions needed at different load points. As such, complex optimization cannot be realized using conventional techniques.

Figure 2:
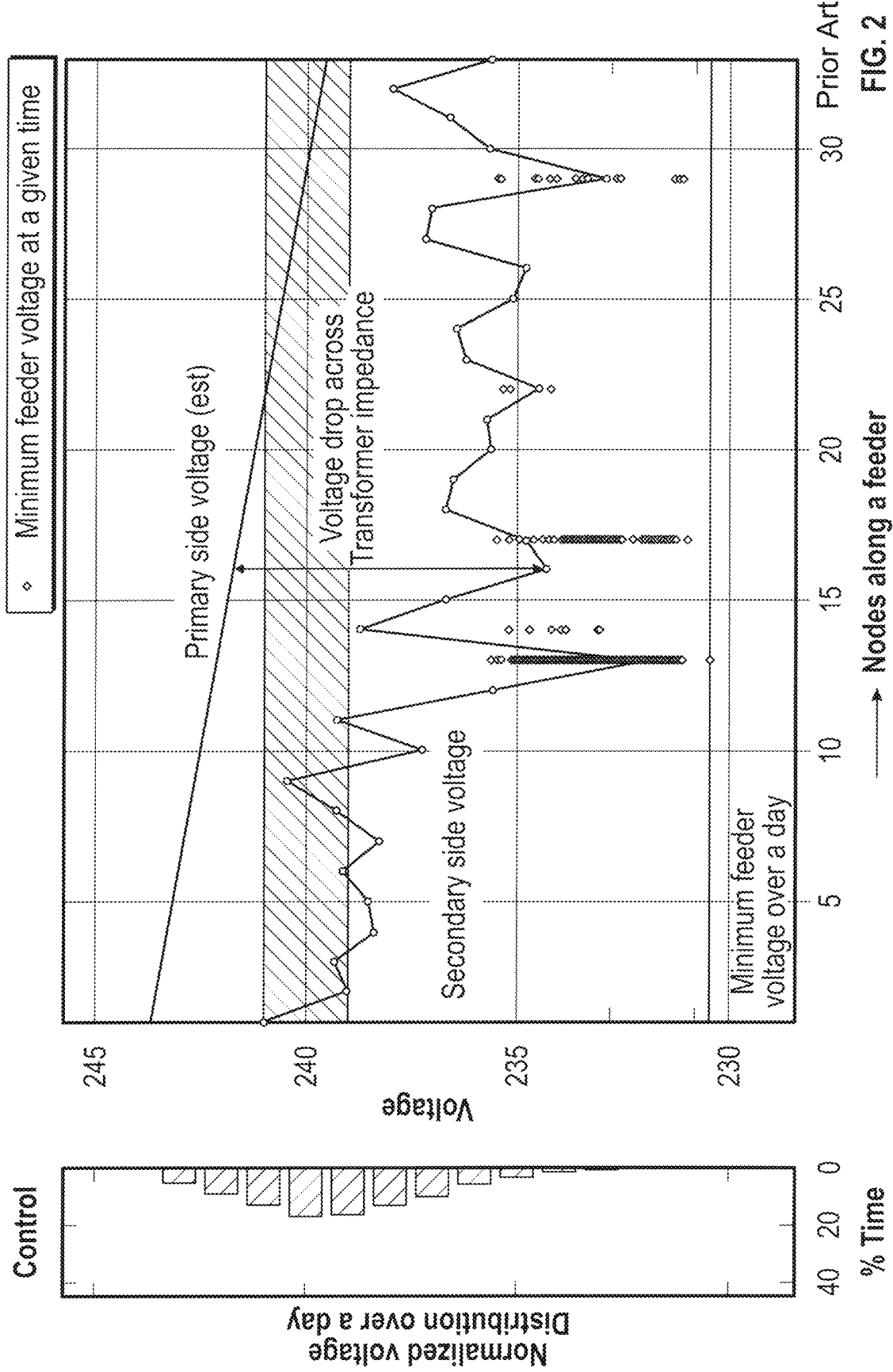
FIG. 2 is a chart illustrating example local voltages along a feeder in a conventional system.

FIG. 2 illustrates an example of actual local voltages along a feeder in a conventional power system, such as power system 100 of FIG. 1. In the example illustrated in FIG. 2, no edge of network grid control is utilized. Therefore, varying levels of control efforts may be required at different nodes along the feeder, which is not possible under a centralized control scheme. As can be appreciated, LTCs cannot compensate for the voltage drop across distribution transformers that result in the illustrated voltage volatility at the grid edge. Again, a substantial, and variable part of the reactive voltage drop occurs across the transformer reactance, which is either never sensed, or goes uncompensated.

Accordingly, various embodiments are directed to voltage and VAR control using edge of network grid VAR source systems and methods. Such edge of network grid VAR source systems and methods may be deployed to an existing power system and may be configured to work with existing LTCs, LVRs and/or capacitor bank infrastructure. That is, voltage and VAR control is delivered using edge of network grid VAR sources, such as but not limited to, edge of network grid optimization (ENGO) devices, smart inverters, smart meters, electric vehicle charges, and the like (one outcome of the voltage and VAR control being voltage and VAR optimization). Examples of VAR sources are described in U.S. patent application Ser. No. 14/659,418 entitled "Systems and Methods for Edge of Network Voltage Control of a Power Grid," which is incorporated herein by reference in its entirety.

By expanding the ubiquity of such devices that deliver voltage control using edge of network grid VAR sources, all levels/aspects of a power system can be controlled. That is, utilizing such edge of network grid VAR sources can effectuate control at the customer level (e.g., load zone). An aggregate of customer level control can result in effectuating control at the feeder level (e.g., regional zone). Upon gaining control of an aggregate of feeders (e.g., substation level), an entire power system or wide area electric grid network can be controlled. It should be noted that as utilized herein, the term VAR source can refer to any autonomous or remotely controlled electronic device capable of directing VARs into an electric grid entry point. Again, examples may include but are not limited to a dedicated VAR source, such as an ENGO, a static synchronous compensator (STATCOM), an inverter or smart (e.g., solar) inverter that can deliver VARs, a VAR-enhanced smart meter, an electric vehicle charger, an ENGO device, a smart home automation device, etc.

In particular, decoupled volt and VAR control at the feeder level is provided. Various embodiments may also provide dynamic lead-lag VAR support for the sub-transmission network. An unprecedented control of feeder voltage profile is provided. Grid optimization such as line loss reduction and peak demand reduction is realized. Grid integration such as distributed PV, load/source dynamics mitigation is also realized. Grid support, such as weak node voltage support and reduced momentary impact is provided. Further still, various embodiments may provide automatic power factor control at the node and/or feeder level. It should be noted that feeder health may be ensured for various embodiments' visibility to feeder level secondary voltages. Still other embodiments may integrate decentralized control with centralized command. Additionally, it should be appreciated that power systems utilizing voltage and VAR control in accordance with various embodiments are less susceptible to and/or resilient with respect to unit/device failure.

Figure 3:
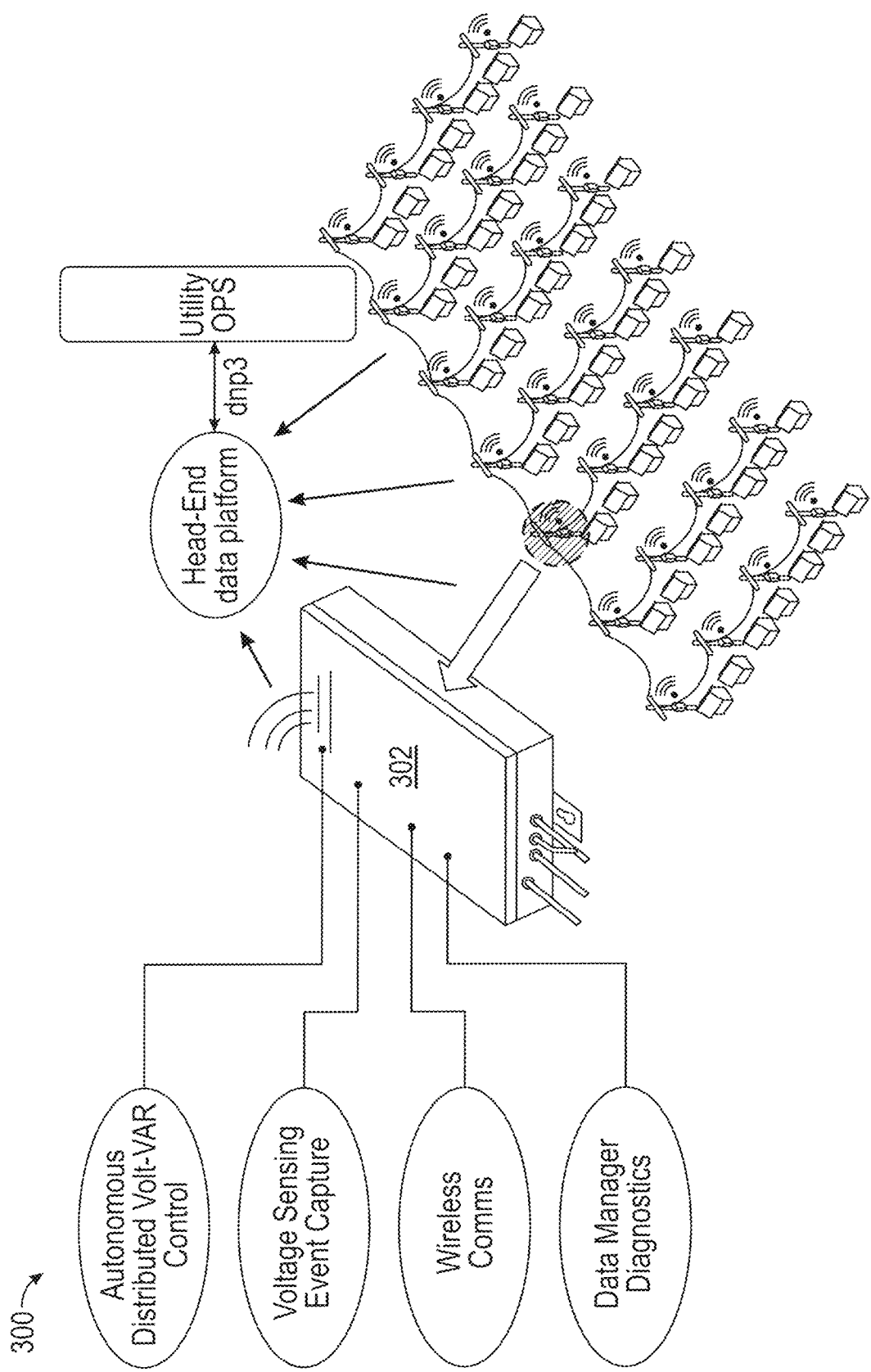
FIG. 3 illustrates a power system with edge of network grid control in accordance with various embodiments of the technology disclosed herein.

FIG. 3 illustrates an example power system 300 in which edge of network grid voltage and VAR control may be implemented in accordance with one embodiment of the technology disclosed herein. As illustrated in FIG. 3, distributed VAR devices such as edge of network grid optimization (ENGO-V) devices may perform edge of network grid optimization. FIG. 3 illustrates one example of a distributed VAR device 302 (which as indicated previously, may be an ENGO-V device). Distributed VAR device 302 may be a decentralized and distributed voltage and VAR regulator unit. Distributed VAR device 302 may have implemented therein, regulation, monitoring, and communications functionalities. An ENGO-V device can provide fast, autonomous, variable responses, as well as system analytics and diagnostics, and is one of a plurality of edge of network grid devices that can be utilized to achieve voltage and VAR control as disclosed herein.

Figure 4:
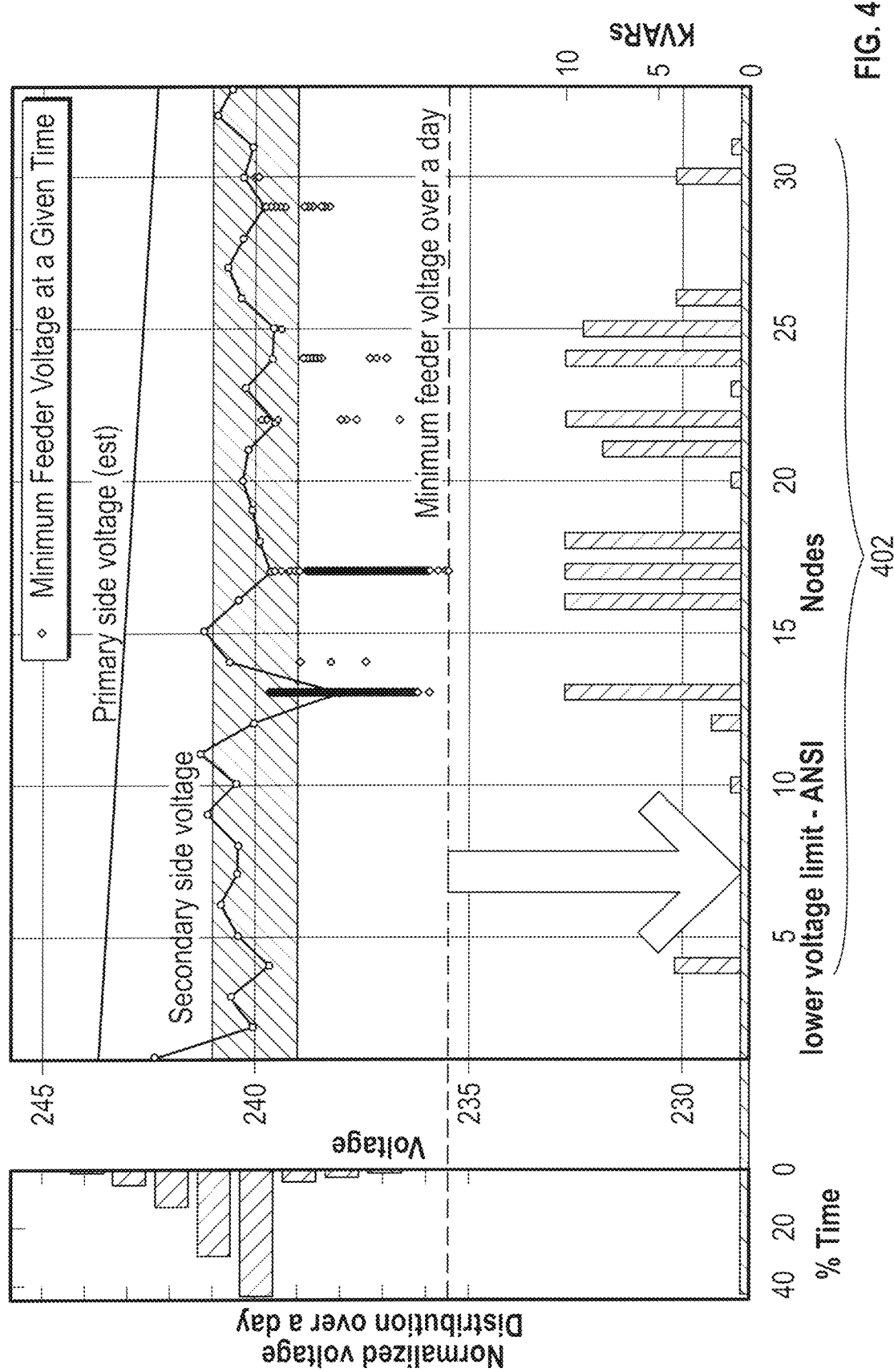
FIG. 4 is a chart illustrating example local voltages along a feeder in a power system with edge of network grid control where a voltage VAR optimization device is enabled in accordance with various embodiments of the technology disclosed herein.

FIG. 4, similar to FIG. 2 illustrates examples of actual voltages along a feeder in a power system. However, the power system whose voltages are charted in FIG. 4 utilizes a voltage and VAR control device, e.g., distributed VAR device such as an ENGO-V. In contrast to the voltage illustrated in FIG. 2, the voltage illustrated in FIG. 4 can be appreciated as being less volatile. This is because the voltage and VAR control device can provide corrective measures at each individual node at a specific time. Bars 402 illustrate this corrective effort at each individual node at a specific time. It should be noted, however, that different control efforts may be needed at different nodes at different instances in time. Regardless, it can be appreciated that the minimum feeder voltage of the day is improved (going from just over 230 Volts to just over 235 Volts in this example), the voltage is distributed more evenly, the secondary side voltage is more stable, etc.

Figure 5B:
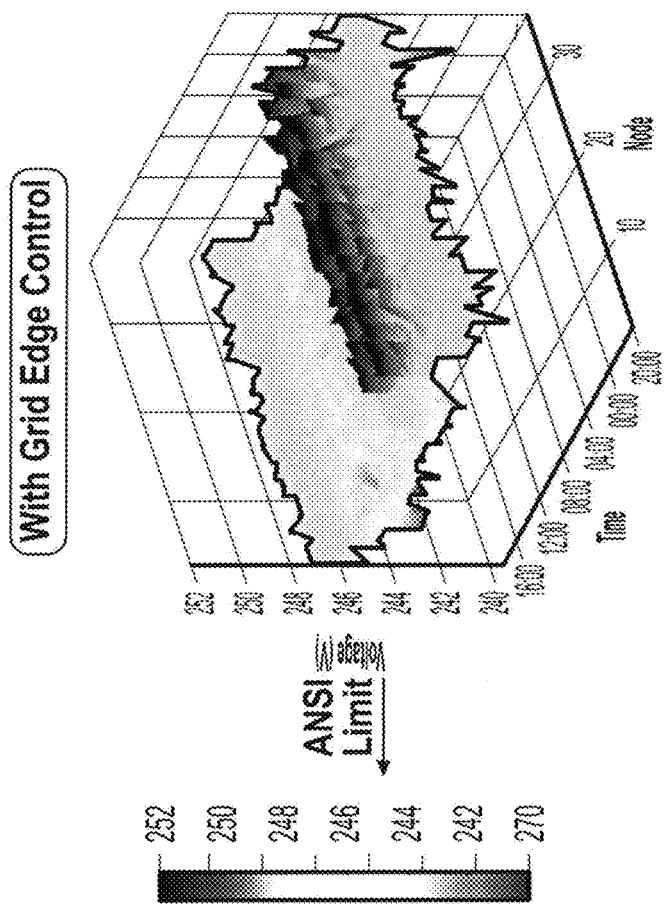
FIG. 5B illustrates an example voltage profile of a power system with edge of network grid control enabled in accordance with various embodiments of the technology disclosed herein.
Figure 5A:
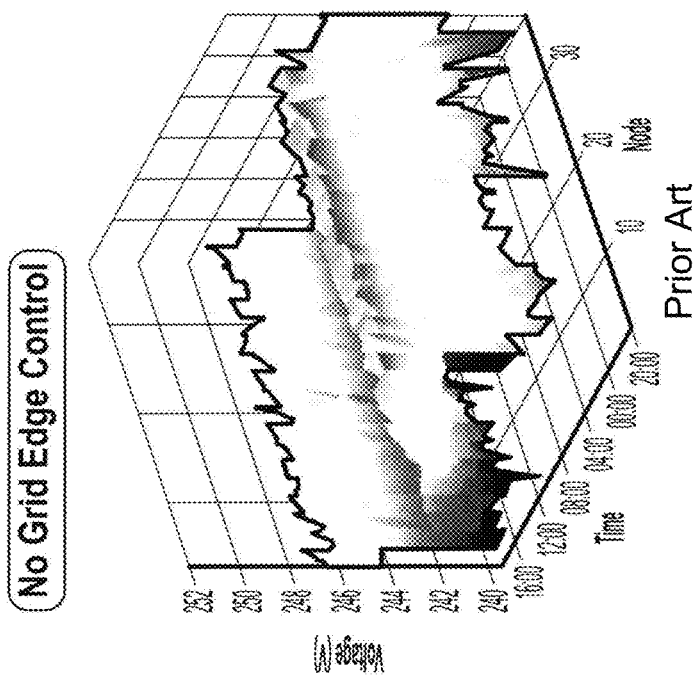
FIG. 5A illustrates an example voltage profile of a conventional power system.

FIGS. 5A and 5B illustrate the respective voltage profiles of a conventional power system and a power system configured in accordance with various embodiments, i.e., where voltage and VAR control is delivered using edge of network grid VAR sources. As illustrated in FIG. 5A, the edge of network grid voltage of the conventional power system without edge of network grid control is volatile/unstable and experiences extended periods of low voltages. The lowest voltage points migrate to different nodes in the system at different times of the day.

In contrast to the voltage profile illustrated in FIG. 5A, the voltage profile illustrated in FIG. 5B is flattened. In the illustrated example, the edge of network grid VAR source has a setpoint of 240 V. As can be appreciated, the voltage volatility is reduced, the secondary and primary side voltage profile is improved, and additionally, self-regulating power factor correction and the ability to control feeder VARs are also provided. Significant levels of voltage loss reduction is observed. It should be noted that an additional margin of 7V is obtained for achieving enhanced energy savings, demand control etc.

Figure 6:
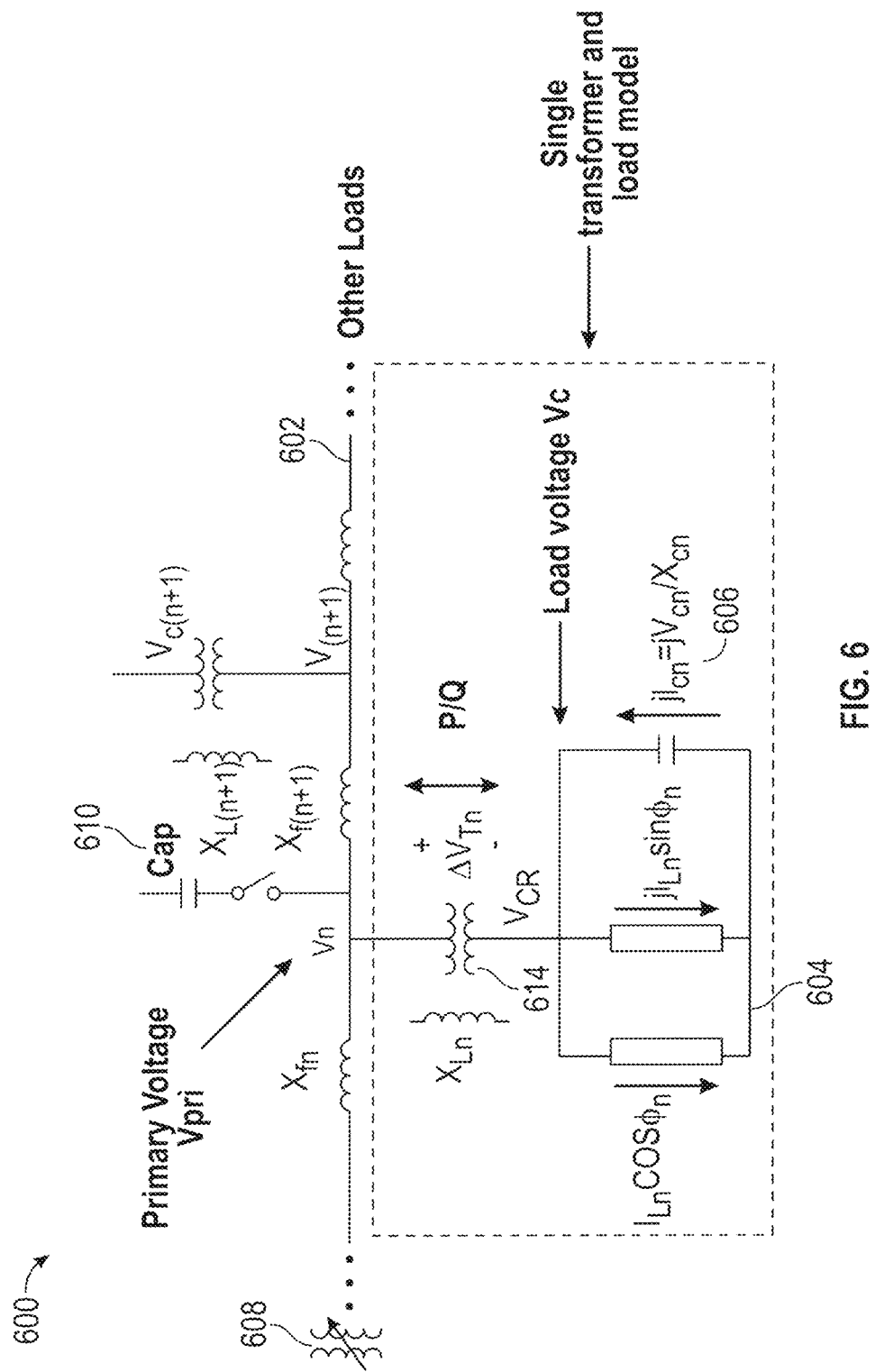
FIG. 6 is a schematic representation of an example power system and load model.

FIG. 6 illustrates an example diagram of a power system 600 in which voltage and VAR control is effectuated in accordance with various embodiments. The illustrated power system 600 may be modeled as including a feeder 602, a load 604, and an edge of network grid VAR device 606 in accordance with one embodiment. The power system and load model may include, e.g., a 25 kVA Transformer (7 kV/240V), six percent impedance (including line), a Load with 5-25 kVA and 0.7 to 1.0 PF, a distributed VAR device (e.g., an ENGO device) that may provide 0-10 kVAR leading, a 3 MW feeder, a 300 kVAR/phase primary capacitor bank, and a transmission line, where the line impedance is 5.65 ohms and line length is 3 miles. It should be noted that although the illustrated example includes a shunt load model, one of ordinary skill in the art would understand that other types of load models may be used while still achieving the same or similar results as disclosed herein.

The feeder model may include an LTC 608, line impedances, primary capacitor bank 610, load 604 (kW/kVAR), and distributed VAR device 606. The primary voltage $V_{PRI}$ is not substantially impacted by one individual load, but may be impacted by the voltage at the substation as well as the aggregated feeder load and VARs. The load voltage Vc can be defined as $V_{PRI}$ minus the voltage drop across transformer 614. The load voltage varies with $V_{PRI}$, load kW (P) and kVAR (Q). Furthermore, the distributed VAR device 606 may impact the effective kVAR (Q) flowing into the feeder 602. It should be noted that a single load is too small to change the primary voltage.

Figure 7:
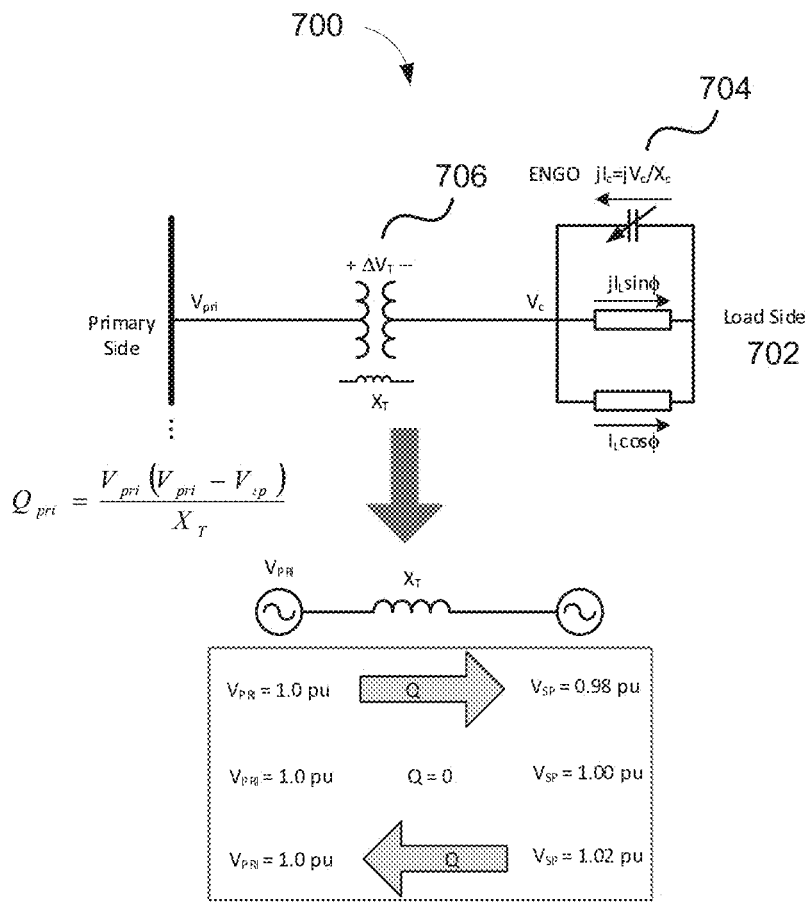
FIG. 7 illustrates a simplified schematic representation of the example power system and load model of FIG. 6.

FIG. 7 illustrates a simplified model 700 for local edge of network grid control, comprising a transformer and load model such as that illustrated in FIG. 6. On the load side 702, a distributed VAR device 704 (e.g., an ENGO) may inject kVARs to maintain the voltage according to a voltage set point. However, the primary voltage on the primary side may be considered to be independent of the voltage on the load side, as a single distributed VAR device, with its small rating, cannot impact the voltage on the primary side. However, by working against the impedance $X_T$ of transformer 706, the distributed VAR device can regulate the voltage on the secondary side.

Within its control range, a distributed VAR device may transform the load side to a voltage source. The primary side reactive power flow (kVARs) may be controlled by controlling the voltage set point. When the voltage set point $V_{sp}$ is set higher than the primary voltage $V_{PRI}$, reactive power flows from the secondary side to the primary, while the opposite happens when $V_{PRI}$ is higher in magnitude than $V_{sp}$. When the voltage set point $V_{sp}$ is set to equal to the primary voltage $V_{PRI}$, unity power factor is realized.

Figure 8A:
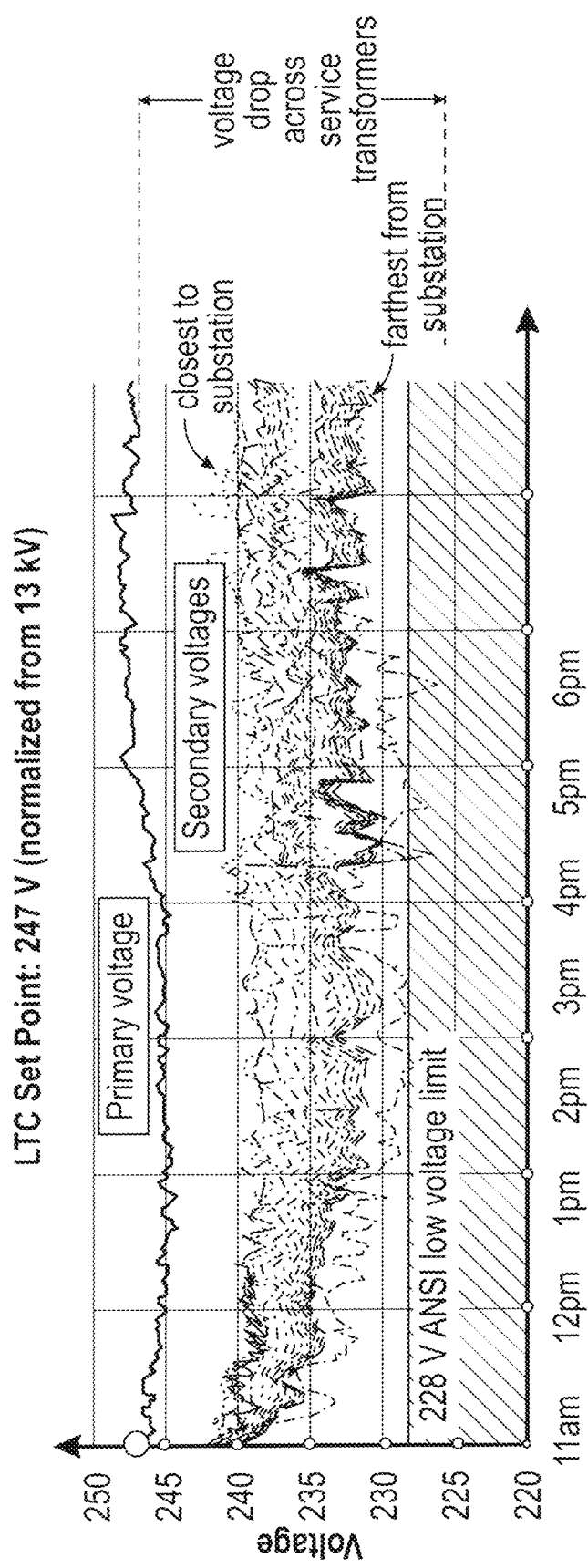
FIGS. 8A, 8B, 8C, and 8D illustrate example effects of implementing various embodiments of the technology disclosed herein with regard to primary and secondary voltages.
Figure 8B:
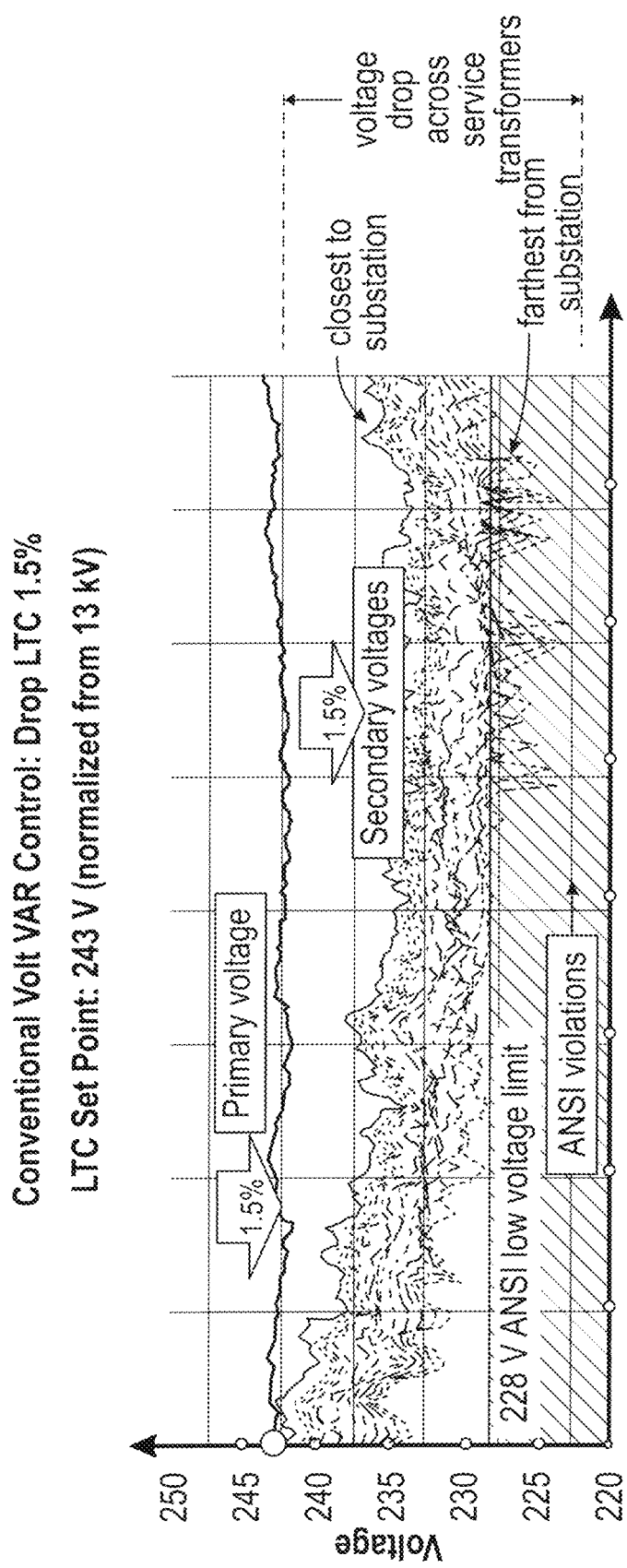
Figure 8C:
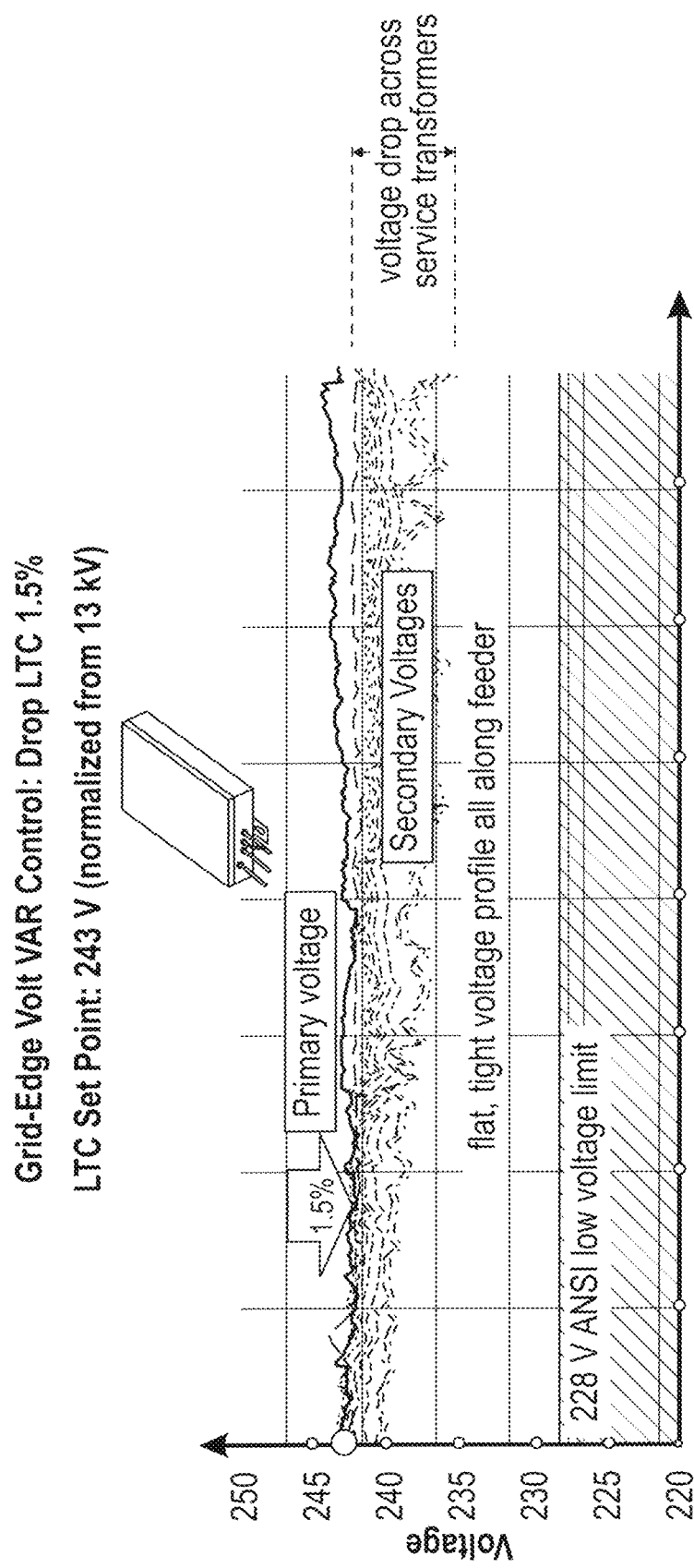
Figure 8D:
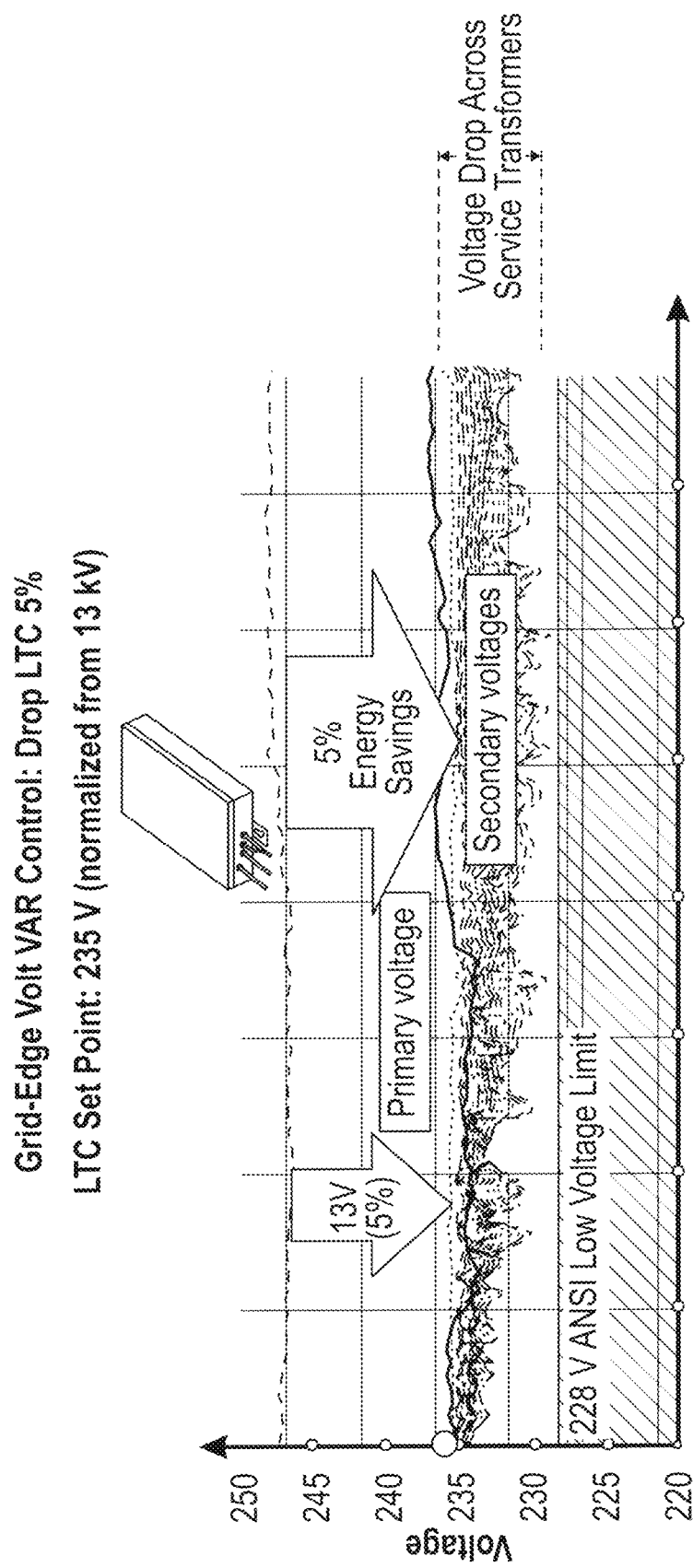

Importantly, a further advantage results from the application of voltage and VAR control as disclosed herein that is unexpected as illustrated in FIGS. 8A-8D. FIG. 8A illustrates an example chart reflecting the primary (substation voltage) at approximately 247 Volts and secondary voltages at a plurality of nodes across a feeder line. The ANSI low voltage limit is at 228 Volts. FIG. 8B illustrates a scenario in which, in an attempt to save some energy by dropping the voltage at the primary and secondary sides, e.g., by approximately 1.5 percent. However, ANSI violations begin to occur, as the secondary voltages begin to dip below the ANSI low voltage limit. As illustrated in FIG. 8C, when voltage and VAR control is enabled, the primary and secondary voltages "meet" (e.g., to within approximately one percent) thereby eliminating the inductive loss observed in FIGS. 8A and 8B due to the voltage drop across transformers and lines, which conventionally can result in, e.g., seven to eight percent difference between primary and secondary voltages. Additionally, ANSI violations cease as well. FIG. 8D illustrates that advantageously still, voltage can be dropped, in this example, by approximately five percent without introducing ANSI violations. Thus five percent energy savings can be realized without the problems experienced in conventional power systems. It should be further noted that voltage and VAR control devices need not be present at each and every node in order to realize the above-described advantages—a very unique aspect of the technology disclosed herein. That is, with only some of the nodes having voltage and VAR control enabled, the same or substantially similar trends in voltage profile still result—a self-balancing effect is observed at a feeder level.

The example scenario illustrated by the voltage profiles shown in FIGS. 8A-8D and explained above suggests that various embodiments are able to provide voltage and VAR control on the secondary side at a connected node, as well as at other points on the feeder, even where VAR source devices are not connected. This means that system-level improvements are being realized automatically without any need (or little need) for some centralized control system/mechanism(s). That is, as more edge of network grid VAR source devices are added to secondary feeders connected to a primary distribution circuit, the power system is able to automatically self-balance to the point where the primary voltage becomes equal to the secondary voltage setpoint. This can provide a distinct advantage, e.g., over systems and methods that rely on controlling voltage through a series-connected device, which may improve voltage control at one specific node, but can also degrade the voltage at other nodes on the feeder.

Further to the above, the ability to automatically self-balance allows the feeder to be operated with a controlled power factor. Adding the ability to control each edge of network grid VAR source device as an individual unit or in the aggregate allows for, e.g., managing solar PVs' effects on individual circuits without sacrificing overall grid stability and voltage and VAR optimization benefits.

Figure 9:
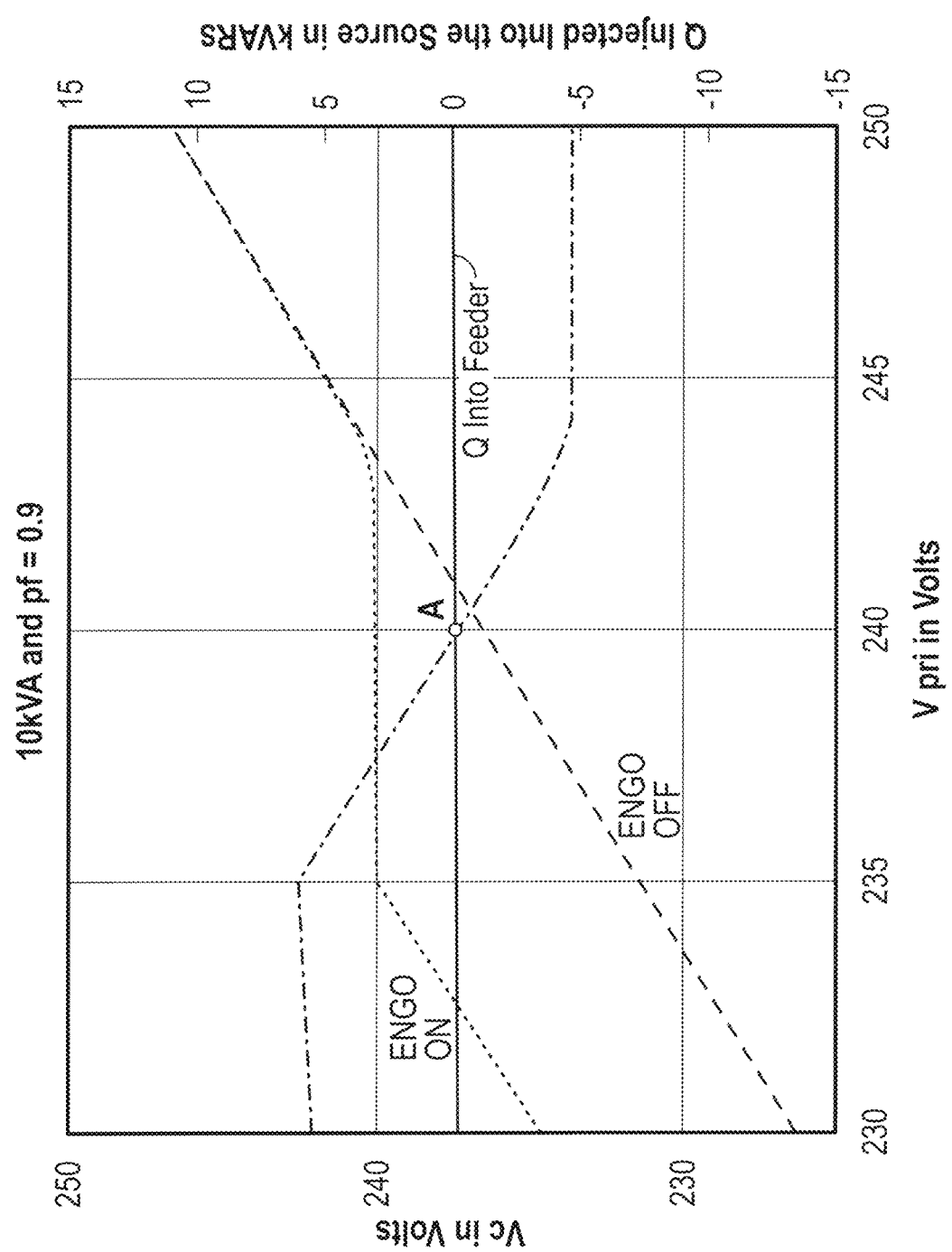
FIG. 9 is a graph illustrating an example local operating point of a power system comparing a scenario where edge of network grid control is enabled to a scenario where it is not.

FIG. 9 illustrates an example of a local operating point and characteristic curve of the power system of FIG. 6 with and without edge of network grid VAR source devices enabled. Again, the power system can comprise a 25 kVA Transformer (7 kV/240V), six percent impedance (including line), a load with 5-25 kVA and 0.7 to 1.0 PF, a distributed VAR device (e.g., an ENGO device) that may provide 0-10 leading kVAR, a 3 MW feeder, a 300 kVAR/phase primary capacitor bank, and a transmission line, where the line impedance is 5.65 ohms and line length is 3 miles.

When the distributed VAR device is disabled, the load voltage Vc varies linearly with the primary voltage $V_{PRI}$. However, the load voltage is desired to have a narrow range (e.g., 240+/−1 volt). When the distributed VAR device is enabled, the load voltage Vc is regulated to the Vsetpoint (e.g., 240+/−1 volt) within its control range. As an example, when $V_{PRI}$ is in the range of 234 to 245 volts, Vc is maintained in the desired range (e.g., 240+/−1 Volts). Outside of the control range, the distributed VAR device operates in a saturated mode i.e. it injects its maximum/minimum capacity of VARs and tries to maintain voltage regulation. Finally, depending on the load power factor and loading level, the VARs injected into the feeder (from secondary side to primary side or vice versa) vary. For example, with the primary voltage at 235V, when the load VAR is lagging 4.9 kVAR, in order to regulate the voltage Vc to a setpoint voltage Vsp the distributed VAR device may inject 10 kVAR leading reactive power, so the system has a leading 5.1 kVAR total reactive power. As another example, with the primary voltage at 243V and with the load VAR still lagging at 4.9 kVAR, in order to regulate the voltage Vc, the distributed VAR device may inject 1.4 kVAR and cause 3.5 kVAR lagging to be sourced from the primary side. Finally, a very unique result of this approach can be illustrated by considering Point A which shows zero reactive power injection when the primary voltage $V_{PRI}$ equals the setpoint voltage (Vc=Vsp=$V_{PRI}$).

Figure 10:
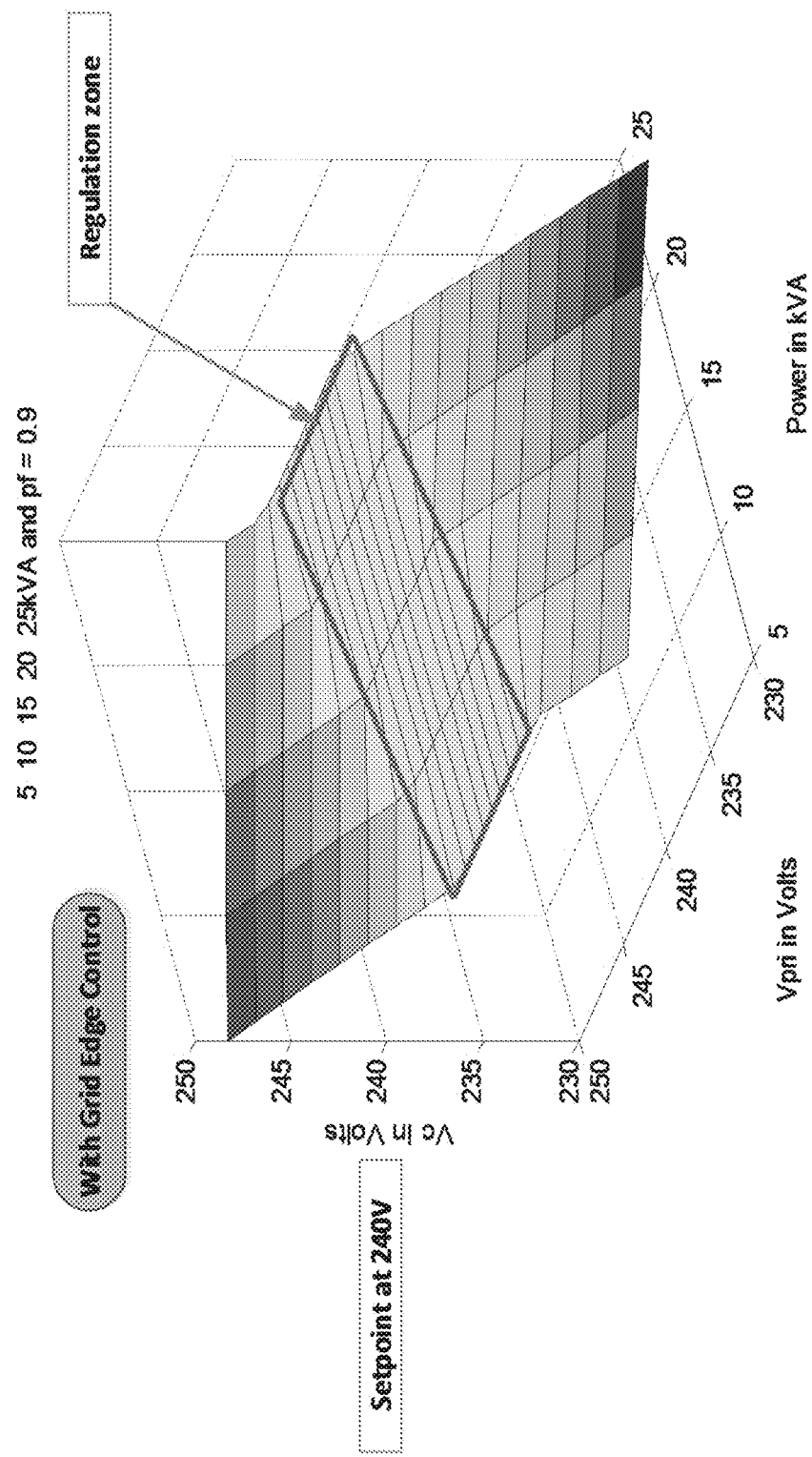
FIG. 10 illustrates a characteristic plot for load voltage and VAR plot of an example power system with grid edge control.

FIG. 10 illustrates a load voltage and reactive power plot of a power system with a distributed VAR device enabled in accordance with various embodiments. The Vsetpoint is set to 240 Volts. As illustrated, the load voltage Vc and the primary voltage $V_{PRI}$, as well as the load level may be varied over the target range. The voltage regulation is achieved over a wide primary voltage and output power range shown as the flat rectangular region.

Figure 11:
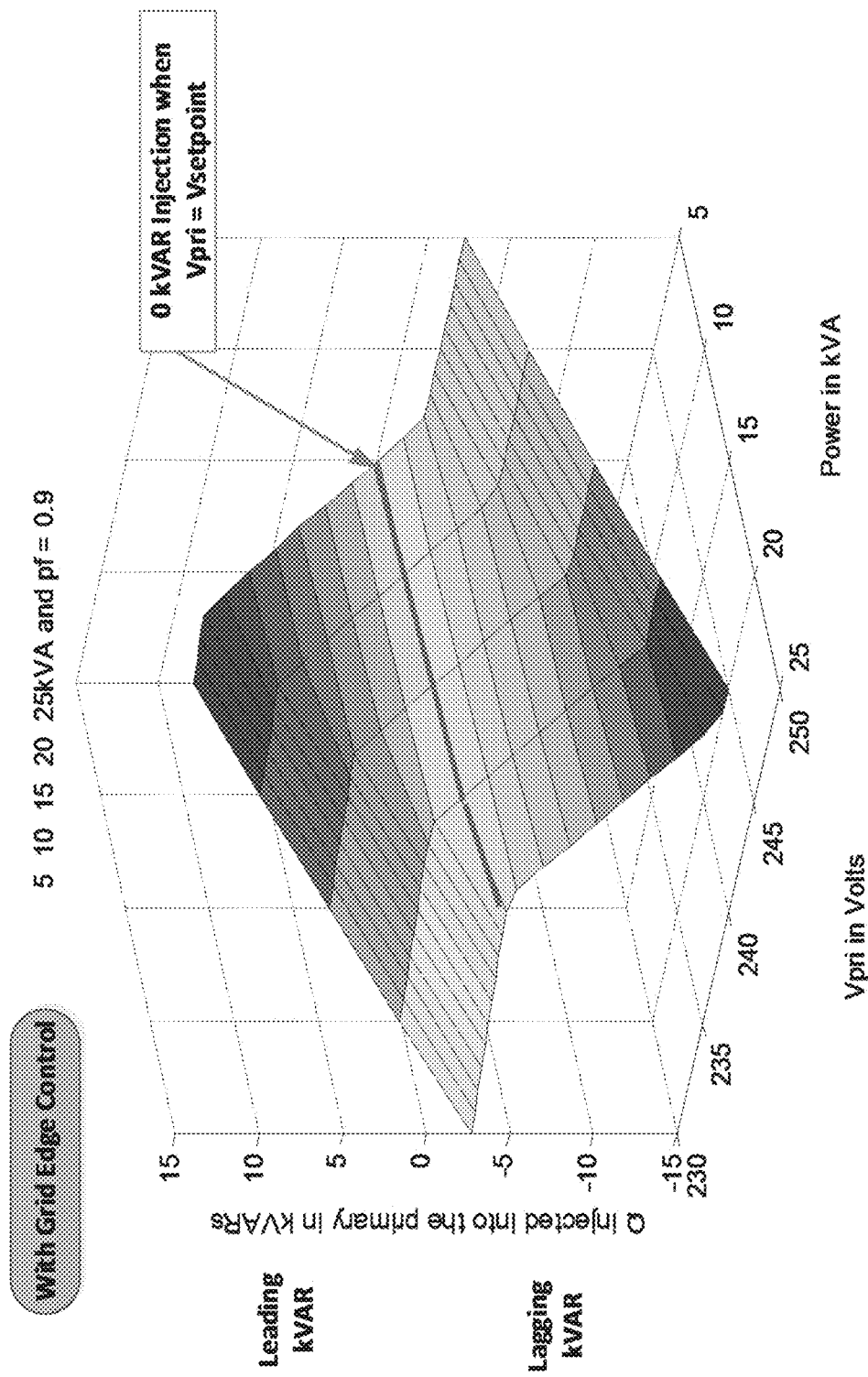
FIG. 11 illustrates example control range over which VAR injection is controlled at each load of the system with Grid Edge Control whose load voltage and VAR plot is illustrated in FIG. 9.

FIG. 11 illustrates the VAR control range as a function of primary voltage $V_{PRI}$, as load power is varied from 5 kVA to 25 kVA at a fixed power factor of 0.9 pf. As illustrated, the primary side reactive power injection can be varied as the primary side voltage and load level is varied. When the primary side voltage $V_{PRI}$ equals the secondary side set point voltage (Vc=Vsp), the injected reactive power level is zero, delivering unity power factor, it should be noted that this occurs regardless of the power level and power factor of the load. As such, via the voltage set point control, leading or lagging reactive power may be delivered. A unity power factor operation may be achieved, independent of actual load VARs, by maintaining voltage setpoint $V_{sp}$ at a value equal to the primary side voltage. This is achieved without any sensing of the actual load current or VARs (i.e., independent of VAR measurements) (nor without knowledge of feeder topology, i.e., independent of feeder topology information), resulting in substantially simpler implementation as compared to traditional power factor correction devices that require current measurement and phase angle information between voltage and current. That is, voltage VAR control that can be achieved in accordance with various embodiments does not require knowledge of the topology of the feeder, and only relies on basic connectivity, which is in sharp contrast to existing voltage VAR optimization schemes that rely on the topology of the feeder. Any change in topology occurring due to a fault detection isolation and/or restoration scheme changes the feeder topology, and substantially changes the optimization done previously. The independence from topology in realizing voltage VAR optimization is very novel. It should be noted that, as described herein, the more distributed VAR sources that are present, the more easily/certain self-balancing can be achieved. Accordingly, the number of VAR sources that may be needed to achieve self-balancing can depend on topology, although once a threshold of VAR sources is met, topology information need no longer be relied upon. The method of operating a system at unity power factor without sensing current and phase angle information with the use of only voltage measurements and setpoint control is completely unique, highly counterintuitive and has never been conceived or thought before, if not felt impossible to achieve.

Returning to the power system modeled in FIG. 6, on the primary side, an injection of 100 kVAR reactive power per phase may yield a voltage difference at 2.8 Volts on a 240 V base. The voltage change per unit reactive power is 0.028V/kVAR. On the secondary side, an injection of 10 kVAR/phase may yield a voltage difference at 5.6 volts on 240 V base. The voltage change per unit reactive power is 0.56 V/kVAR. Therefore, the impact of secondary side control is already 20 times greater than that of the primary side.

Reactive power injected by each individual distributed VAR device may be aggregated on the primary side to provide additional voltage regulation. For example, ten distributed VAR devices, each of which have 10 kVAR may provide a total of 50 kVAR reactive power on the primary side to provide a 1.4 Volt boost, which amounts to a total of 7 Volts on the secondary side. In addition, each load coupled to the distributed VAR device may observe different control action as needed, which is not possible under conventional centralized command and control.

Figure 12:
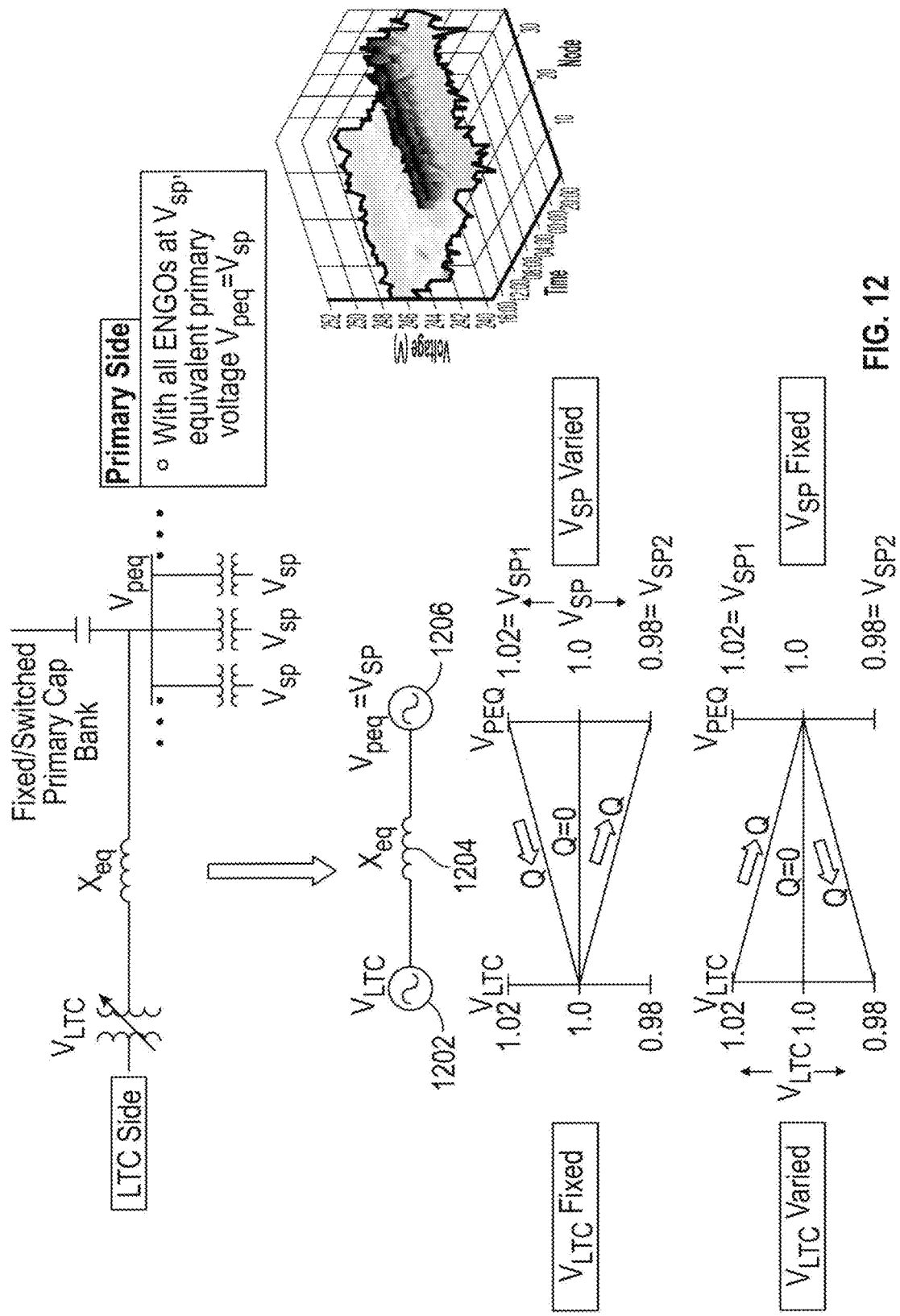
FIG. 12 is a schematic representation illustrating an example comparison between primary and secondary side VAR control.

FIG. 12 illustrates how the local level model developed in FIG. 6 can be aggregated to understand and achieve feeder level control. As more distributed VAR sources, which are regulating the voltage at the local terminals, increase on the system, provided that all the VAR sources are regulating the voltage to the same level (or nearly the same) for instance say a voltage setpoint Vsp, it is observed that the primary side voltage also becomes equal to this setpoint voltage Vsp. This can be explained as follows, considering a plurality of distributed VAR source devices all set to the same voltage setpoint, when the primary voltage is lower than the setpoint voltage, VARs start flowing from the VAR source device to the primary side until the voltages equalize and the VARs stop flowing. Likewise, if the primary voltage is higher than the setpoint voltage, VARs from the inductive load are pulled, again, until the voltages equalize. By running multiple edge of network grid VAR source devices at the same or similar voltage setpoints (but still tweakable to compensate for certain drops/increases), this results in the aforementioned self-balancing aspect of the technology disclosed herein. Now, the feeder is reduced to a model that can be thought of as a voltage source (VLTC) 1202 representing the substation transformer, and inductive component 1204 representing line impedances, and a second voltage source $V_{peq}=V_{sp}$ 1206, as a result of the self-balancing aspect of this control. As alluded to previously, when the two voltages are equal, in this case VLTC=Vpeq=Vsp, the reactive power flowing within the substation transformer 1204 becomes zero, and unity power factor operation is obtained at a feeder level. This is independent of the total real and reactive power being demanded by loads on the system at any instant of time. Therefore, irrespective of the operating condition of the feeder and without any knowledge and visibility of local loads or even feeder level real or reactive power and/or current/voltage, the voltage and power factor of the entire feeder can be regulated with a simple setpoint control.

Essentially, power factor compensation can be determined without the need for measuring load power factor. Additionally still, secondary side voltage can be increased above the substation voltage VLTC resulting in leading VARs flowing into the power system or secondary side voltage can be decreased below the substation voltage VLTC resulting in lagging VARs flowing into the power system. As such, the feeder can be "converted" from a stochastic problem into what is essentially a feeder-level STATCOM. Two very unique properties are realized: first, by controlling the differential voltage (VLTC–Vsp) the reactive power on the feeder is controlled dynamically, achieving a STATCOM-like functionality from the feeder; second, by controlling the common-mode voltage (VLTC+Vsp)/2, real power can be controlled. For example, up to +/−5% of demand control can be achieved with controlling the common-mode voltage.

Figure 13:
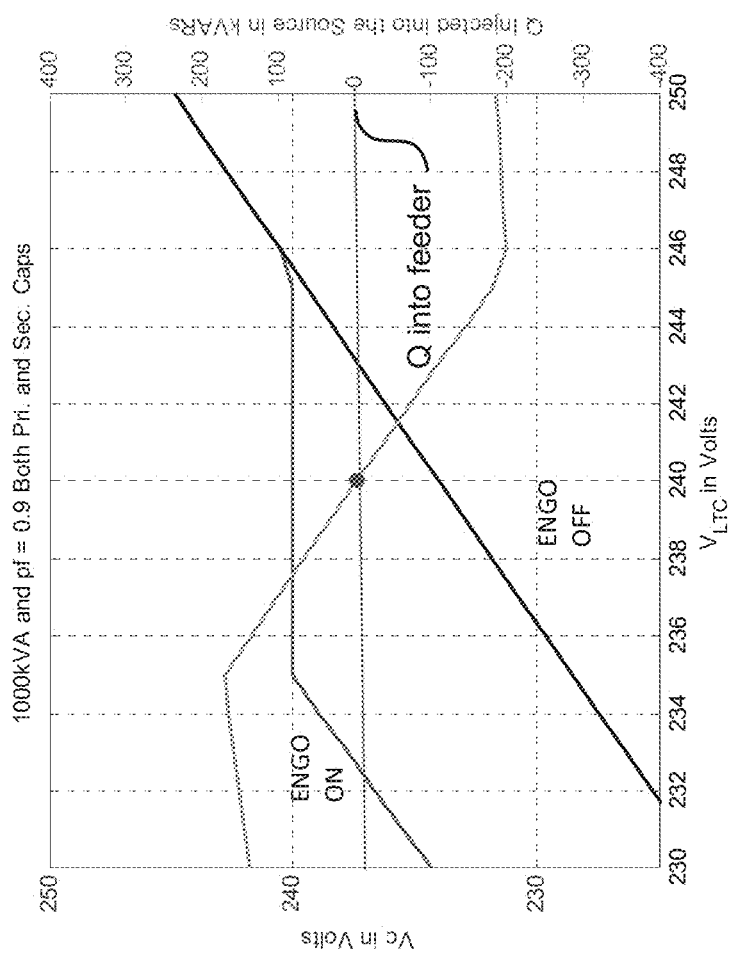
FIG. 13 is a graph illustrating an example feeder level characteristic curve of a power system in which a scenario with voltage and VAR control is enabled is compared with a scenario in which it is not enabled.

FIG. 13 illustrates an example feeder level operating point of a feeder in which a distributed VAR source devices are both enabled and disabled. As illustrated, when a distributed VAR device is enabled, independent of load VARs, when the primary voltage $V_{PRI}$=Vc (=Vsp setpoint voltage), no amount of reactive power 0 kVARs is injected into a feeder. By changing the primary side voltage $V_{PRI}$ or Vc setpoint, the amount of reactive power (i.e., lead or lag VARs) delivered to feeder may be regulated. As such, compared with primary capacitor banks, various embodiments may realize at least twenty times the level of feeder level VAR control. By setting the LTC set point (i.e., $V_{PRI}$) equal to the setpoint voltage (Vc setpoint) unity power factor at the feeder can be ensured. Varying LTC or Vc setpoints may deliver fast controllable lead/lag VARs at the substation. Furthermore, independent demand control, energy reduction, energy efficiency and feeder VARs is also provided.

Figure 14:
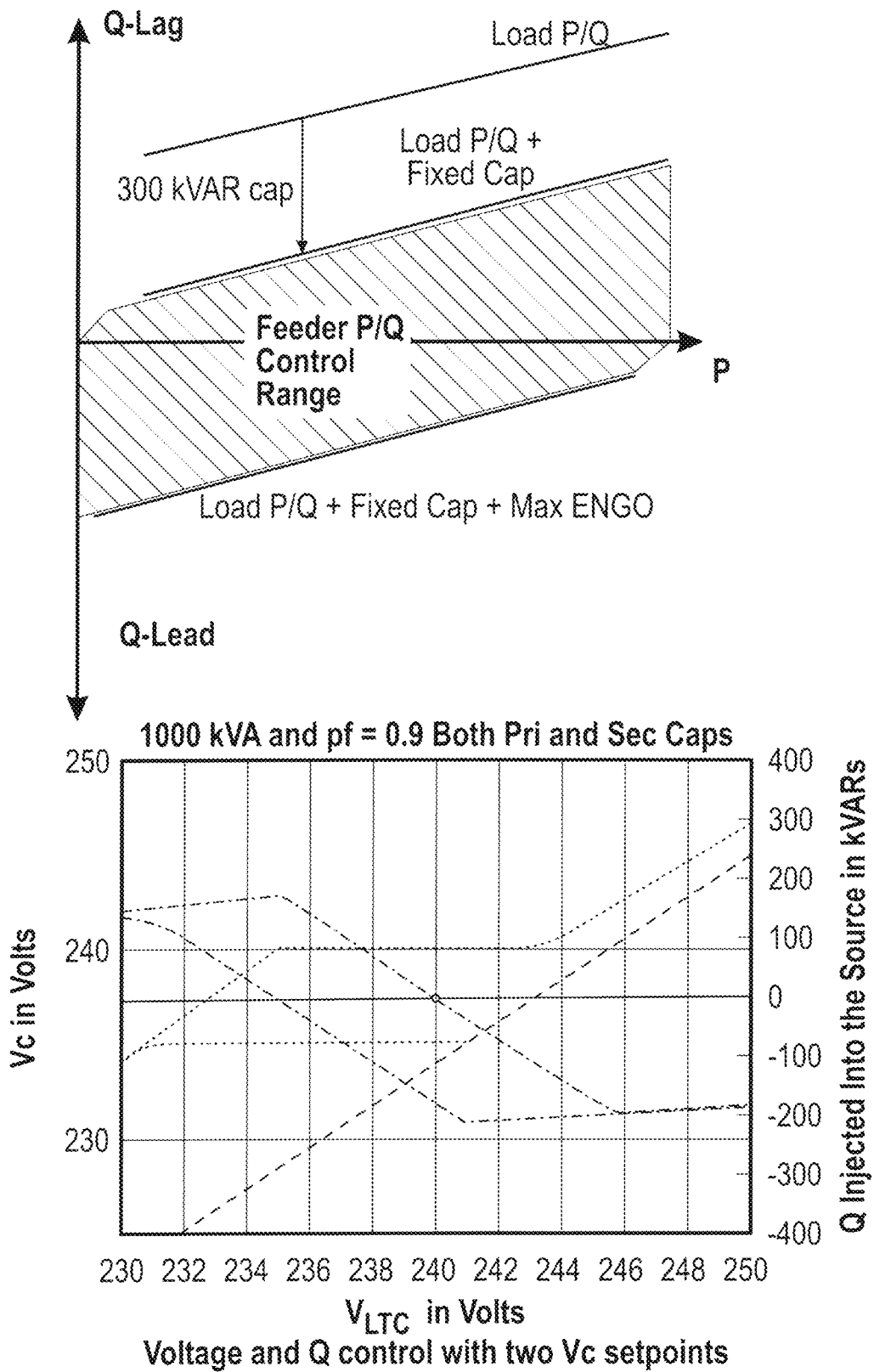
FIG. 14 illustrates an example of feeder control in accordance with various embodiments of the technology disclosed herein.

FIG. 14 illustrates an example feeder control in accordance with one embodiment of the technology disclosed herein. One example of the feeder parameters may be as follows: 3 MW @ 0.95 PF at peak loading (900 kVARs lagging); 1 MW @ 0.9 PF at minimum load (400 kVAR lagging); Fixed capacitor bank of 300 kVAR; 60 ENGO V10 units for a maximum of 600 kVAR.

Figure 15:
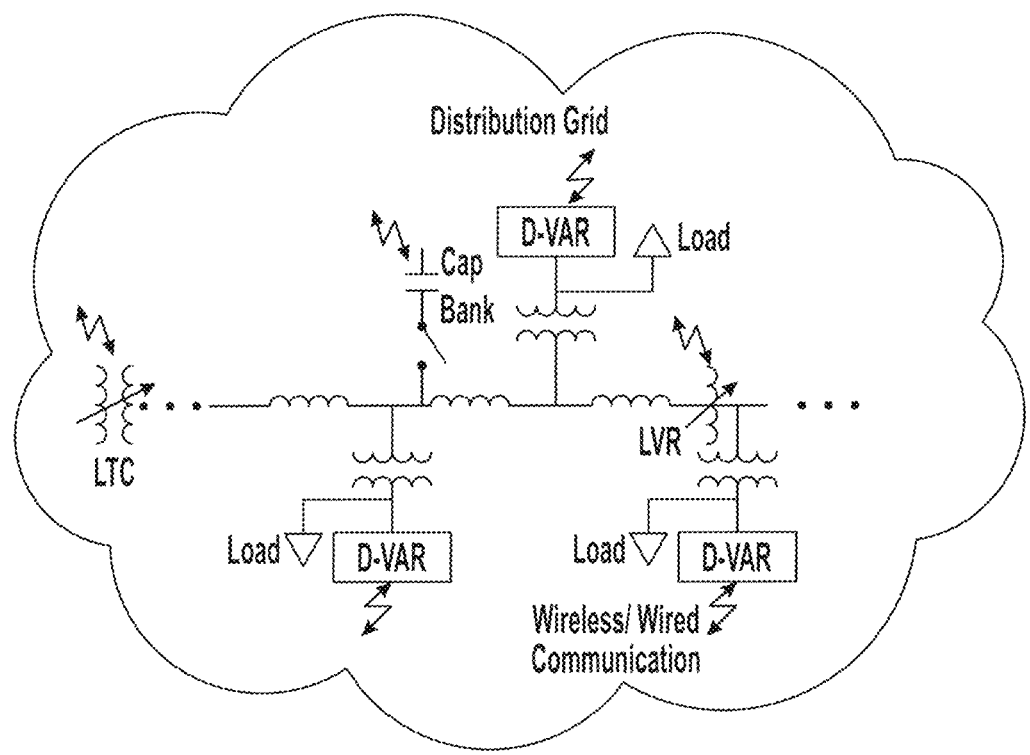
FIG. 15 illustrates an example control diagram for effectuating voltage and VAR optimization in accordance with various embodiments of the technology disclosed herein.
Figure 15:
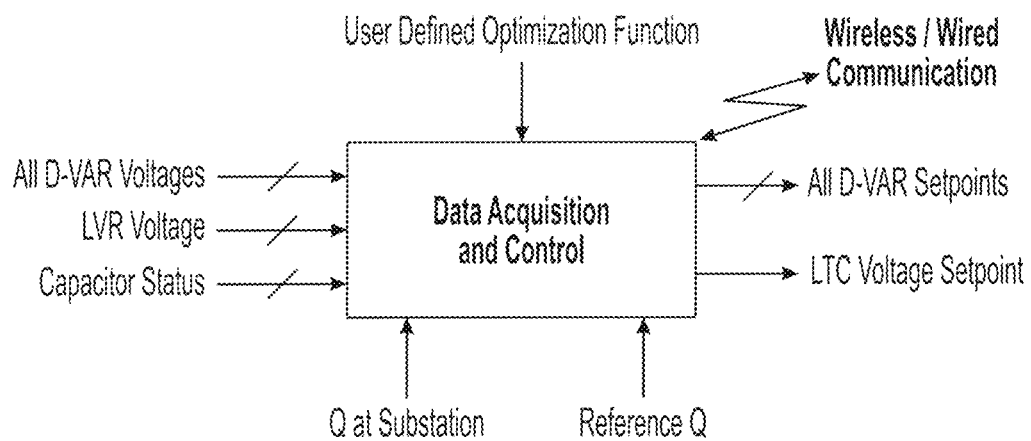

FIG. 15 illustrates an example control diagram. A user may input an optimization function such as CVR, loss minimization etc. into an optimizer which computes the setpoints $V_{SPi}$ for all the distributed VAR devices on a power system. These setpoints may be exactly the same or somewhat different. These setpoints are dispatched to all the distributed VAR devices through a communication channel (wired or wireless). This achieves the objective of local control. The controller may take inputs from capacitor banks and a Line Voltage Regulator (LVR), in addition to the distributed VAR devices to compute the setpoints. When all the distributed VAR devices work together, they start impacting the regional level VARs and collectively affect the feeder reactive power. Although not necessary, the reactive power reference value Qref and the measured reactive power Qsub may be also provided as an input to the optimizer, if reactive power control is the objective. The optimizer may then use these values to determine the desired LTC voltage $V_{LTC}$. For example, to achieve CVR keeping the power factor of the system at unity, the voltage of the LTC may be reduced to a target that achieves the CVR benefits. The setpoint voltage of a distributed VAR device may be matched to the LTC voltage to ensure zero net reactive power.

Figure 16:
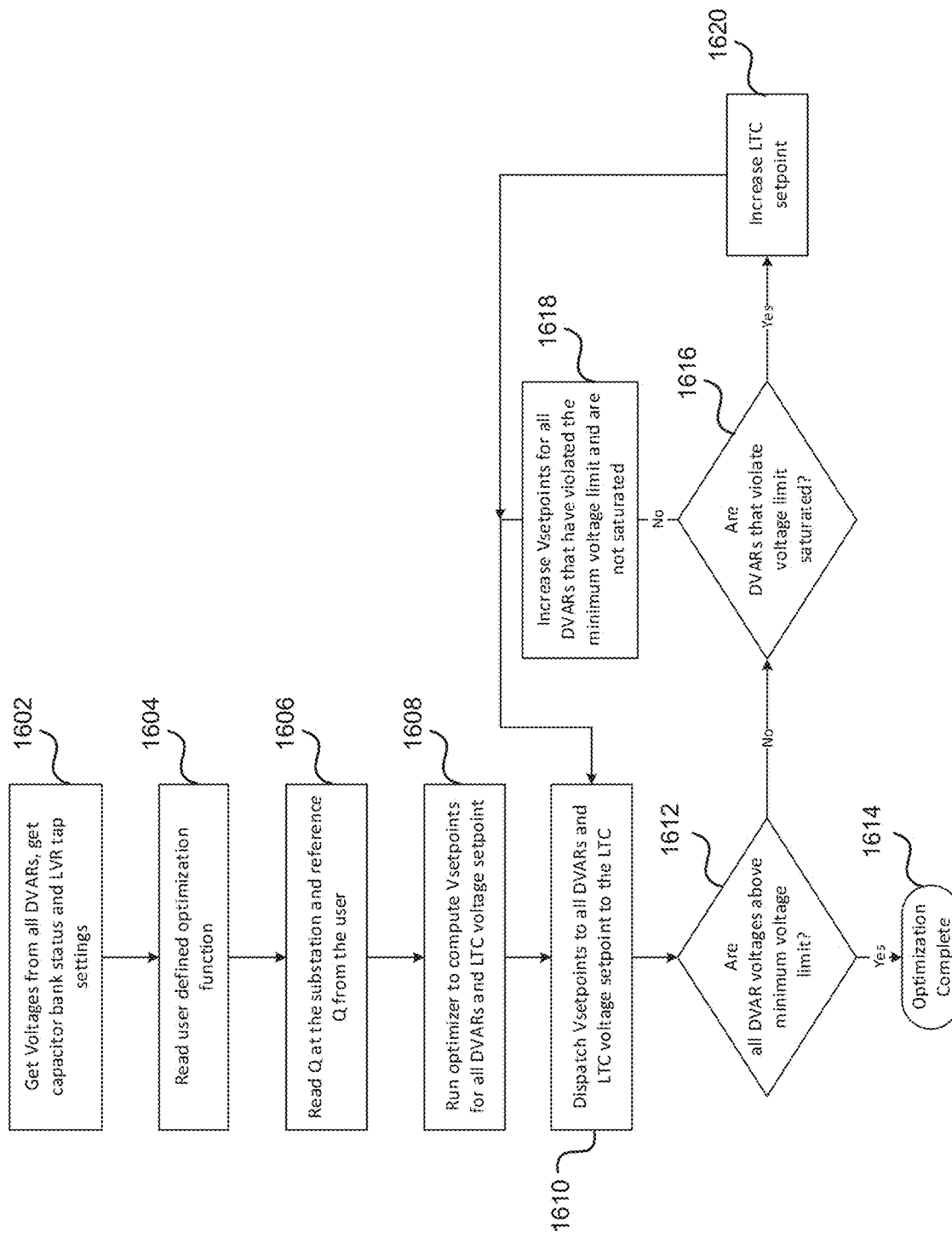
FIG. 16 is an operational flow chart illustrating example processes performed for achieving voltage and VAR optimization in accordance with various embodiments of the technology disclosed herein.

FIG. 16 illustrates an example flow chart for optimizing voltage and reactive power in accordance with various embodiments. At operation 1602, voltages from all distributed VAR source devices in a power system are obtained, as well as capacitor bank status and LVR tap settings. At operation 1604, a user-defined optimization function is read/analyzed to determine desired optimization. At operation 1606, if available, the reactive power Q is read at the substation level as well as a reference reactive power Q specified by the user. It should be noted that one or more of operations 1602-1606 may be optional. As previously described, parameters such as the reactive power Q may not be needed, capacitor bank(s) need not be controlled/connected to/compensated for. However, to fine-tune system operation, obtaining such parameters can be performed and voltage setpoints can be derived therefrom. At operation 1608, an optimizer is run to compute the setpoint voltages for each distributed VAR source device as well as the setpoint voltage for the LTC. At operation 1610, the voltage setpoints are dispatched to the distributed VAR source devices and the setpoint voltage for the LTC is likewise dispatched to the LTC. If all the distributed VAR source device voltages are determined to be above a minimum voltage limit at operation 1612, optimization can be completed at operation 1614. If the distributed VAR source device voltages are below some minimum voltage limit (determined at operation 1612), it is determined whether the distributed VAR source devices that violate the minimum voltage limit, are saturated at operation 1616. If so, the LTC voltage setpoint is increased at operation 1620. If not, the voltage setpoints for all the distributed VAR source devices that have violated the minimum voltage limit and are not saturated are increased at operation 1618. The process returns to operation 1610 to dispatch these increased voltage setpoints.

At a system level, the voltage profile and VARs at a substation can be independently controlled by adjusting VLTC and $V_{sp}$ independently. $V_{sp}$ can be set to be the same for all the distributed VAR devices, or the setpoint voltage be set differently. A VLTC can be controlled to adjust the voltage and the VARs similar to the manner discussed above. Those skilled in the art would appreciate that the distributed VAR sources using the described approach may cover only 15-20% of the nodes on the system and yet achieve a completely flat voltage profile across the feeder by virtue of the self-balancing feature. This capability is not feasible under conventional state-of-the-art systems and methods, where VAR control typically requires capacitor banks to be switched, and is thus limited in terms of dynamic capability. The switched capacitor banks also do not allow compensation of varying voltages at individual nodes. The overall value delivered to utilities thus includes individual node voltage control, voltage flattening across the feeder, feeder level power factor control, primary side voltage control, enhanced conservation voltage reduction, dynamic and enhanced demand control and feeder level dynamic VAR control—all using VLTC and $V_{sp}$ as the controlled variables.

Various embodiments provide an unprecedented V/Q control range. Regulating D-VAR voltage setpoint may provide demand and CVR management. A wide range of decoupled voltage and VAR control is provided. By regulating the LTC setpoint equal to the distributed VAR source device setpoint, zero reactive power flow is realized thereby achieving a unity power factor operation. As an example, those skilled in the art would appreciate that with this approach even with only leading VAR sources regulating local voltages to a defined setpoint Vsp such as ENGO devices, an effective lead-lag reactive power control at the substation can be achieved.

As alluded to previously, subsidies and incentivization of the installation of residential and commercial solar PV systems may occur through two mechanisms FIT and NEM.

Under the FIT scheme, a consumer is paid for energy produced by a solar PV system at a (sub-retail) rate determined by the distributor or retailer of electricity (traditional utility). This typically requires the use of two meters, e.g., one meter for computing the energy consumed by the consumer's household or business, and another meter for computing the energy produced by the consumer's solar PV system.

In contrast, under the NEM scheme, energy produced by a solar PV system is first used by the consumer, with any excess energy produced being sold back to a traditional power utility at a rate determined by the distributor or retailer of electricity. In this manner, NEM tends to first lower the electricity bills of the consumer by virtue of the consumer being able to utilize solar power rather than energy provided by a traditional power utility. If excess energy is generated, the consumer is then paid (or given a credit) for that excess solar PV system-generated energy.

Although FIT provides direct incentives for producing clean solar energy (where in some cases, regulatory authorities even pay a premium price for the energy produced by solar PV systems), and though the cost of solar PV system-generated energy has declined over recent years, the justification for premium FIT programs has become weak. As a result, the FIT scheme is being phased out by many utilities around the world.

NEM, on the other hand, is still relied upon by many utilities, e.g., in the form of net-FITS for excess energy sold back to the grid. Such utilities, also referred to as distributors or "retailers" buy electricity from an electricity distributor (responsible for "power connections" and maintaining assets on the grid) and sell that electric power to consumers. Thus, the majority of such electricity retailers do not own any lines, transformers, or any other assets needed for distributing power, yet are responsible for providing power/electricity to consumers, as well as managing billing associated with the sale of electricity. Additionally, some such retailers tend to own clean power generation facilities such as medium-sized solar farms, bio-gas plants, wind, wave power plants, etc.

Yet another model that drives consumers to install solar PV systems on their rooftops is referred to as the Solar Power Purchase Agreement or the Solar PPA. In accordance with this Solar PPA model, the solar utility bears the cost of the entire solar system and the installation (on consumers' rooftops) costs. Once installed, the consumer pays the solar utility an amount per kWhr of solar power (generally lower than that charged by the local utility as per the Solar PPA). The total monthly solar bill paid by the consumer is for the total amount of energy produced by the solar panels. As the consumer pays a lower price per kWhr for the solar energy produced than the amount paid to the electric utility, the consumers have an incentive to install solar PV systems. However, in such an arrangement, the solar utility does not have any incentive to effect demand control nor to play a role similar to that of an electric utility, despite earning other incentives such as sale of solar credits to other organizations, guaranteed long term revenues, etc.

Today, many electric utility companies view distributed solar energy as a threat to their fundamental source of revenue, i.e., the sale of electrical energy. As the penetration of solar PV systems increases (at an exponential rate in many parts of the world especially Germany, Australia, and California in the US), the threat may become a reality.

Accordingly, various embodiments are directed to using one or more techniques discussed above to allow a new type of utility to be realized, e.g., an electric utility or a solar utility that can incentivize increasing distributed solar energy on their existing systems (while simultaneously reaping the benefits of active demand control, energy savings in certain situations, and increased efficiency without burdening the consumers or requiring any regulatory transformations).

Such a utility, for the purposes of the disclosure herein, can be referred to as a "green electric utility" or GEU. In accordance with various embodiments, a GEU can bear the cost of solar PV system installed on a consumer's rooftop and thereby eliminate the high upfront cost for the consumer. Concurrently, the GEU can maintain complete control over the solar PV system panels, while also distributing electricity to the consumer just like an electric retailer utilizing, e.g., at least one or more aspects of the control mechanism(s) illustrated in FIG. 15 and/or the control methodology illustrated in FIG. 16.

In particular, a GEU may purchase electricity from the wholesale electricity market at a price defined by the market (e.g. at a locational marginal pricing (LMP) price at a specific node). Additionally, the GEU may generate energy from solar panels installed on its customers' rooftops at some levelized cost of energy (LCOE), while selling electricity to the customers as a combination of the electricity bought from the wholesale electricity market and the electricity generated by solar PV systems installed on its customers' rooftops. Further still, the GEU can control around plus or minus two percent of the energy consumed by the customers using "zero-droop voltage control" via VAR injection from the aforementioned solar inverters. It should be noted that, as opposed to conventional voltage control as a function of reactive power, zero-droop voltage control is utilized, where a curve is used with a droop. This curve is essentially a linear curve, where for every voltage, a specific amount of VAR is to be injected into the system. However, to make sure that multiple inverters working with the same droop curve do not begin hunting each other, the size of the droop is fairly large, thereby consuming most of the aforementioned ANSI voltage band/range. Further, a dead-band is also specified in the curve, within this dead-band, the reactive power injection is maintained to be zero. In other words, the inverters doesn't operate for the most part and needs to inject reactive power only if the voltage goes outside of this dead-band. Again, to ensure that multiple inverters do not begin hunting each other, the size of this dead band is kept large 2-3%.

Figure 17:
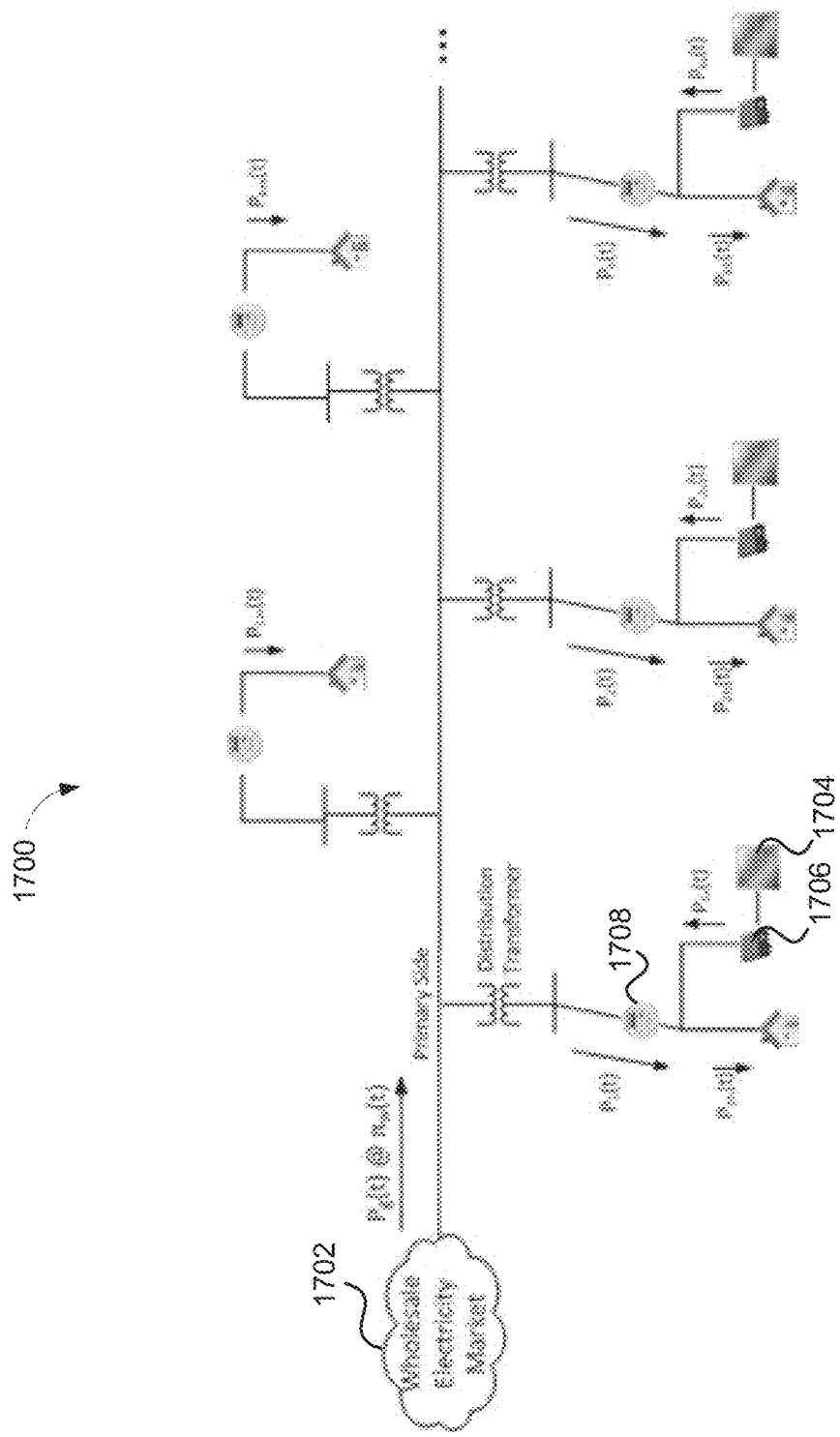
FIG. 17 illustrates an example power system incorporating solar energy generation in which various embodiments may be implemented.

For example, as illustrated in FIG. 17, an example power system 1700 in which zero droop voltage control is used by solar inverters 1706 to inject VARs. As described above, a GEU can purchase electricity from the wholesale electricity market 1702, and solar panel(s) 1704 installed on a customer's rooftop can also generate solar energy. Meter 1708 could be used for computing the energy consumed by the customer's household or business. A GEU would be able to then vary the local load via inverter VAR injection as previously discussed. Besides solar inverters, other VAR sources may include but are not limited to a dedicated VAR source, such as an ENGO, a static synchronous compensator (STATCOM), an inverter or smart (e.g., solar) inverter that can deliver VARs, a VAR-enhanced smart meter, an electric vehicle charger, an ENGO device, a smart home automation device, etc.

A utility with these capabilities does not presently exist due to, e.g., perceived low profit margins. However, a GEU may utilize a "free" VAR source to control load demand and energy consumed, and to use this "lever" to reduce the purchase of energy at high cost and possibly sell more energy at low cost, while maximizing revenues at a system level is considered to be highly novel, contrary to the conventional perception of low profit margin. Such localized voltage and VAR control allows the GEU to precisely control the voltage, and move it up/down at the local level to achieve as much as about plus or minus two percent of the kW and kWHr consumed at that node (as previously discussed). This level/amount of control alone could be used by the GEU to its advantage to reduce energy purchases when the LMP for wholesale electricity is high, and to maximize revenues while still delivering voltage within service agreement bounds.

As the number of solar inverters controlled by the GEU in a certain region increases to beyond approximately 10% of peak feeder capacity, the GEU starts realizing energy control benefits as high as about plus or minus five percent, a significant amount. The GEU can use these inverters to affect demand by about plus or minus five percent at a fairly fast rate limited only by communication latencies. Generally, the communication latencies will be on the order of several seconds to a few minutes at most. Further, as variation in energy prices occur at an hourly level (but could be as low as 15 mins), these latencies will not pose problems in control. With this approximate plus or minus five percent in energy control, the GEU can use aggregate energy and participate in ancillary markets for frequency regulation, ramp rate control, and ACE error control.

To the above, and as the cost of energy in spot markets peak during the day and coincide with peak solar generation, the GEU can use arbitrage by selling excess energy produced by solar in spot markets and also precisely throttle down the energy consumed by loads during these lightly loaded conditions.

The fundamental equation that drives such a GEU model at a system level is given below:

$$\text{Net Profit at any time } t = t\left[\sum_k (\pi_c P_{kh}(t) - \pi_s P_{ks}(t)) - \pi_w(t)P(t)\right]$$

$$P(t) = \sum_k P_{kh} - P_{ks}$$

In the above equation, the variables are defined as follows: $\pi_w$=wholesale price of electricity purchased by the GEU; P(t)=total power purchased at time t; $\pi_c$=price charged by the GEU to the $k^{th}$ consumer for energy consumed; $P_{kh}(t)$=power sold to the $k^{th}$ consumer at time t; $\pi_s$=price charged by the GEU to the $k^{th}$ consumer for energy produced by PV panel; and $P_{ks}(t)$=power produced by the $k^{th}$ consumer's PV panel.

The uncontrolled variable in the above equation is $\pi_w$, $P_{ks}(t)$, while the fixed variables are $\pi_c$ and $\pi_s$, and the controlled variables are $P_{kh}(t)$ and P(t). By controlling, $P_{kh}(t)$, the utility can control P(t) and maximize the net profit at any time t. Different values and combinations of the variables in the above equation can give rise to different models (the objective being to maximize the net profit for the GEU).

Figure 18:
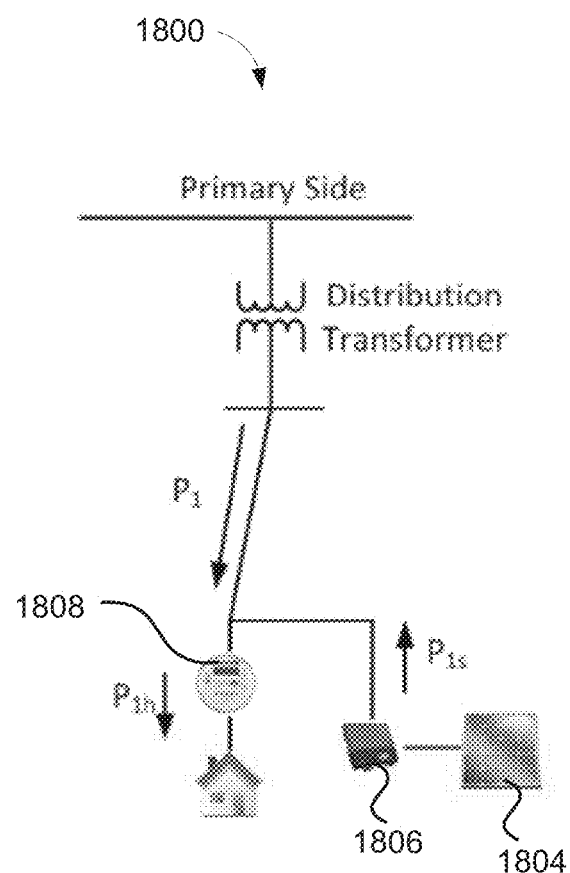
FIG. 18 illustrates an example power system incorporating solar energy generation in which a GEU can control voltage locally via VAR injection in accordance with one embodiment.

In accordance with one embodiment, a first GEU model can be referred to as a "Grid-Side GEU-Owned DER," where DER refers to "Distributed Energy Resources." In this embodiment, the GEU may sign a contract at a lower than average price per kWhr for the electricity bought by the consumer for the next 20 years that increases at about a 2-3% rate every year, $\pi_c$. The GEU charges less to the consumer as the consumer essentially "rents" his roof for the solar PV system install. An energy sale=$\pi_c P_{1h}$, while the incentive for the consumer is a reduction in electricity bills due to lower than average rates at which the consumer may purchase energy. FIG. 18 illustrates an example power system 1800 in accordance with the above embodiment, where a solar PV system (panel(s)) 1804 are installed per the GEU, and again, the GEU can rely on an inverter 1806 to inject VARs as needed while meter 1808 can track energy consumed (without distinguishing generated solar power which goes back to the GEU) by the consumer's household or business.

Figure 19:
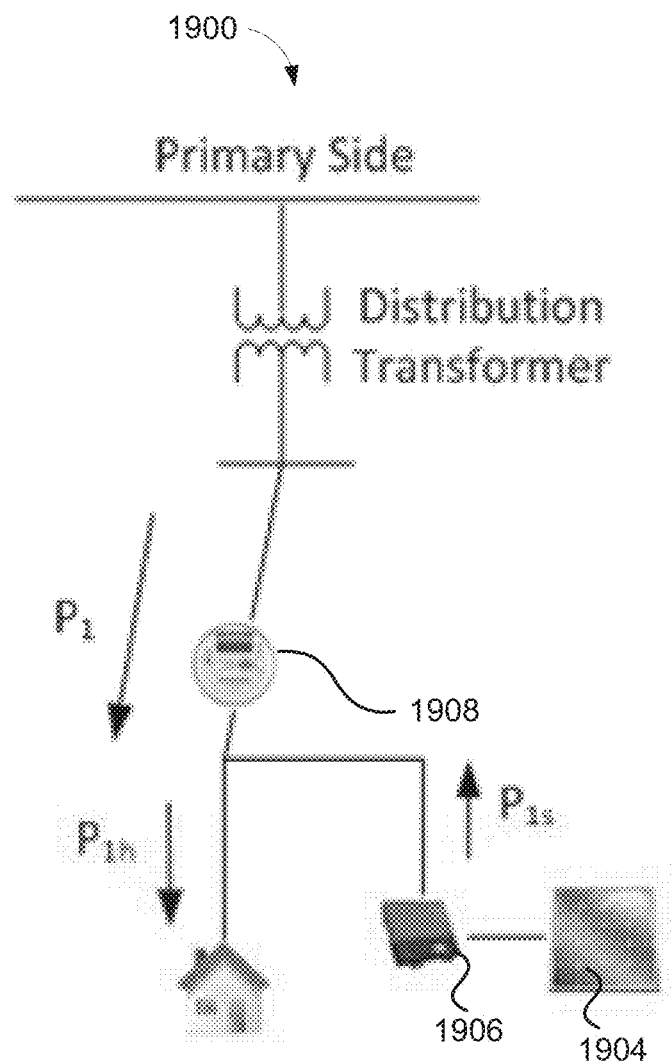
FIG. 19 illustrates an example power system incorporating solar energy generation in which a GEU can control voltage locally via VAR injection in accordance with another embodiment.

In accordance with another embodiment, a second GEU model can be referred to as a "Consumer-Side GEU-Owned DER," where the GEU signs a contract at a price equal to the average price per kWhr for the electricity bought by the consumer for the next 20 years that increases at a 2-3% rate every year, $\pi_c$. Here, an energy sale=$\pi_c P_1 = \pi_c(P_{1h} - P_{1s})$. Compared to the first GEU model, an energy sale is a function of the power sold to the consumer as well as the power produced by the consumer's solar PV system. The incentive for the consumer in this second GEU model is a reduction in electricity bills through reduced net energy because solar energy offsets the net energy consumed by the consumer. Like FIG. 18, FIG. 19 illustrates an example power system 1900 in accordance with the above embodiment, where a solar PV system (panel(s)) 1904 are installed per the GEU, and again, the GEU can rely on an inverter 1906 to inject VARs as needed, and meter 1908 to calculate consumer energy usage (again) as a function both power sold and (solar) power generated.

Figure 20:
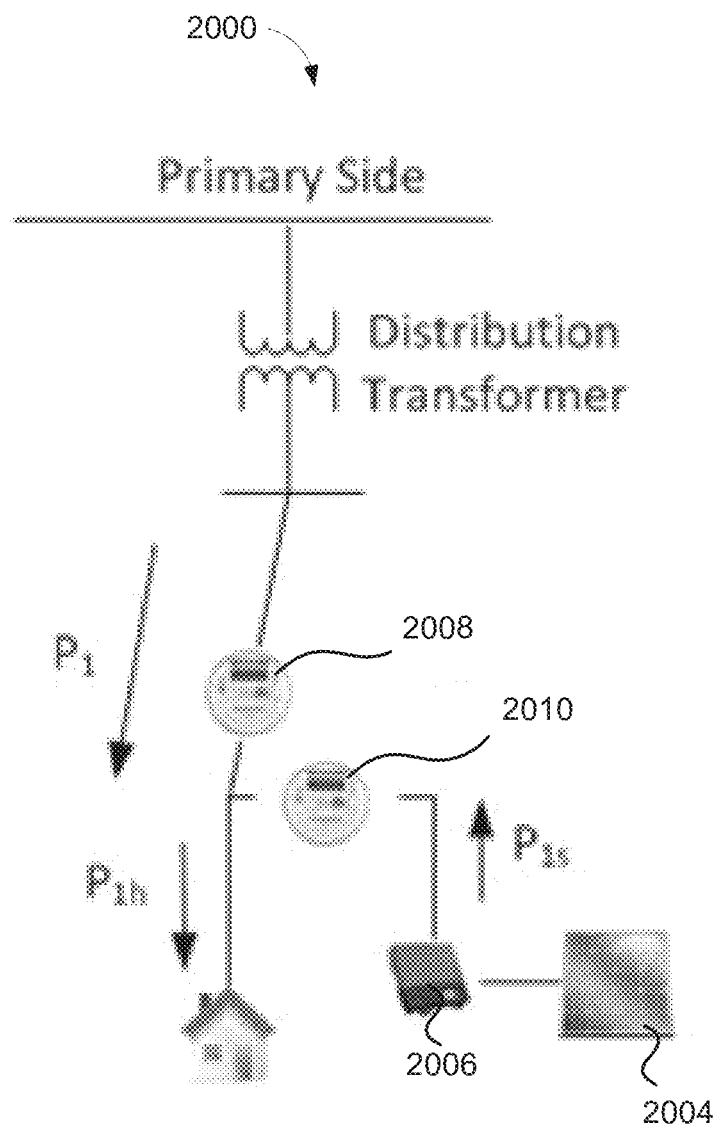
FIG. 20 illustrates an example power system incorporating solar energy generation in which a GEU can control voltage locally via VAR injection in accordance with still another embodiment.

In accordance with yet another embodiment, a third GEU model can be referred to as a "Solar PPA+Energy Billing" model. In this third GEU model, the GEU may utilize two meters, one for charging the consumer for net electricity consumed and the other for the energy produced by the consumer's solar PV panels. The rate at which energy produced by the solar PV panels can be subsidized if the consumer is willing to have a solar PPA for 20 years. In this third GEU model, an energy sale=$\pi_c P_1 + \pi_s P_{1s}$, where the energy sale is hence a function of the total power and that produced by the consumer's solar PV system/panel(s). Here, the incentive for the consumer is a reduction in bills as the net effective price of electricity is reduced. FIG. 20 illustrates an example power system 2000 in accordance with the above embodiment, where a solar PV system (panel(s)) 2004 are installed per the GEU. The GEU can rely on an inverter 2006 to inject VARs as needed, meter 2008 for computing the energy consumed by the consumer's household/business, and meter 2010 for calculating solar power produced.

In accordance with each of the above GEU models, the GEU owns the solar PV systems. Moreover, the GEU can control the solar PV systems (due to their location, size, etc.) to in turn, control energy demand at will without impacting consumers' quality of service (QoS). As alluded to above, this can be achieved through a zero droop control of voltage (i.e., no droop between no-load to full-load which is fixed at a certain level to affect demand control. In the long run, energy savings and net efficiency improvements can also be obtained. Further, with a high enough penetration of GEU-owned solar PV systems, the GEU can also participate in aggregated energy markets, and support VAR flow on the primary side through the aggregation of secondary side VARs from the PV panels (as previously described). It should be noted that this can be accomplished without breach of contract issues. It should further be noted that in all the above models, the GEU always has full visibility into the amount of energy generated by each solar panel. That is, any meters implemented on different lines represent the quantities used for billing purposes.

Figure 21:
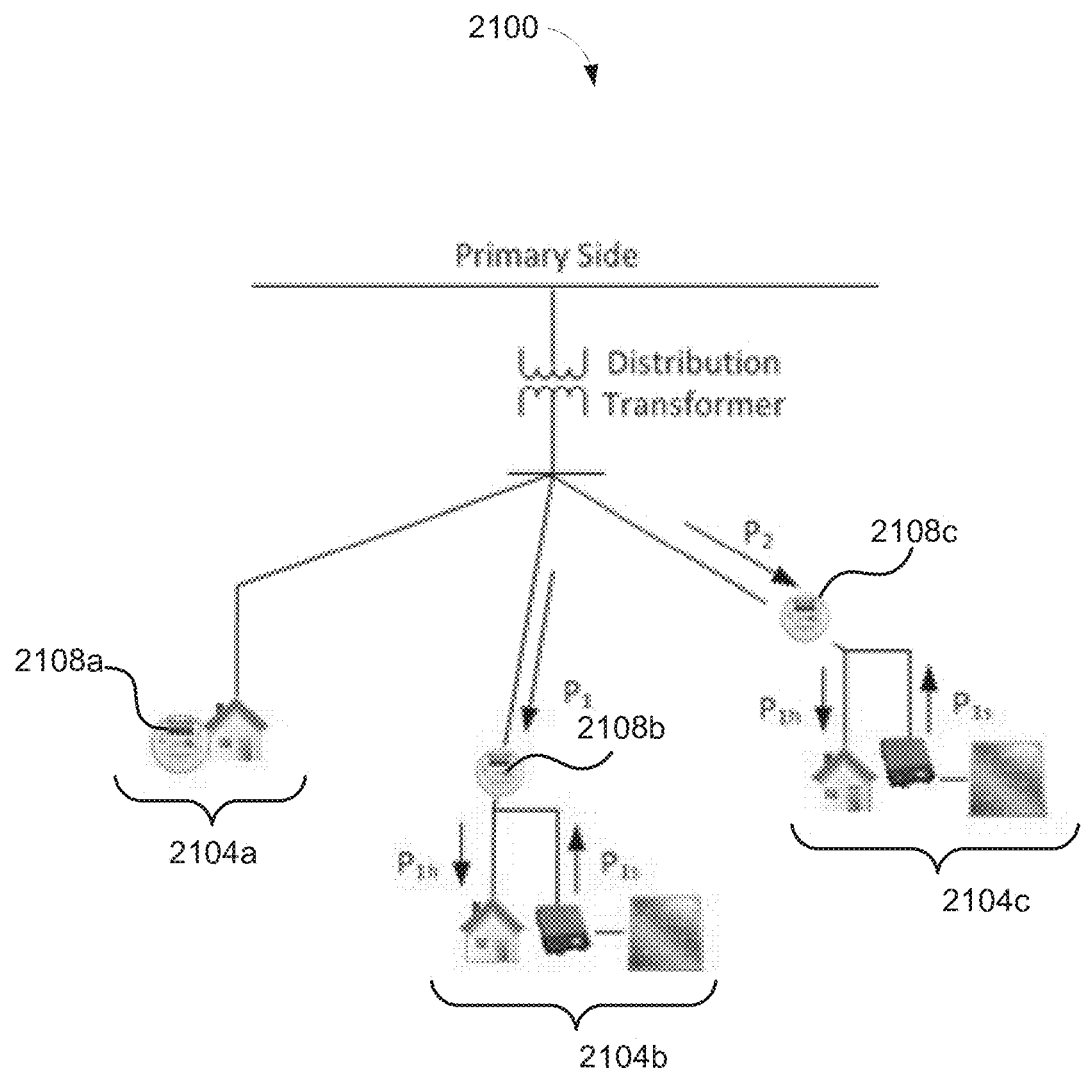
FIG. 21 illustrates another example power system incorporating solar energy generation in which a GEU can control voltage locally via VAR injection in accordance with various embodiments.

FIG. 21 illustrates an example of the manner in which a GEU can control energy demand to maximize its profits. In FIG. 21, a power system 2100 is shown as encompassing a first consumer house/business 2104a without a solar PV system installation and a meter 2108a for computing energy consumed by first consumer residence 2104a. Power system 2100 also includes a second consumer house/business 2104b having a solar PV installation and meter 2108b for computing energy usage, as well as a third consumer house/business 2104c which also employs a solar PV system and meter 2108c for tracking energy usage. In power system 2100, $P_1=P_{1h}-P_{1s}$, and similarly $P_2=P_{2h}-P_{2s}$, where P1, P2 are the net real power drawn by the respective consumer (house/business), P1h, P2h are the real power drawn by the respective consumer (house/business), and P1s and P2s are the real power produced by the respective solar panel(s) at any point in time.

Figure 22:
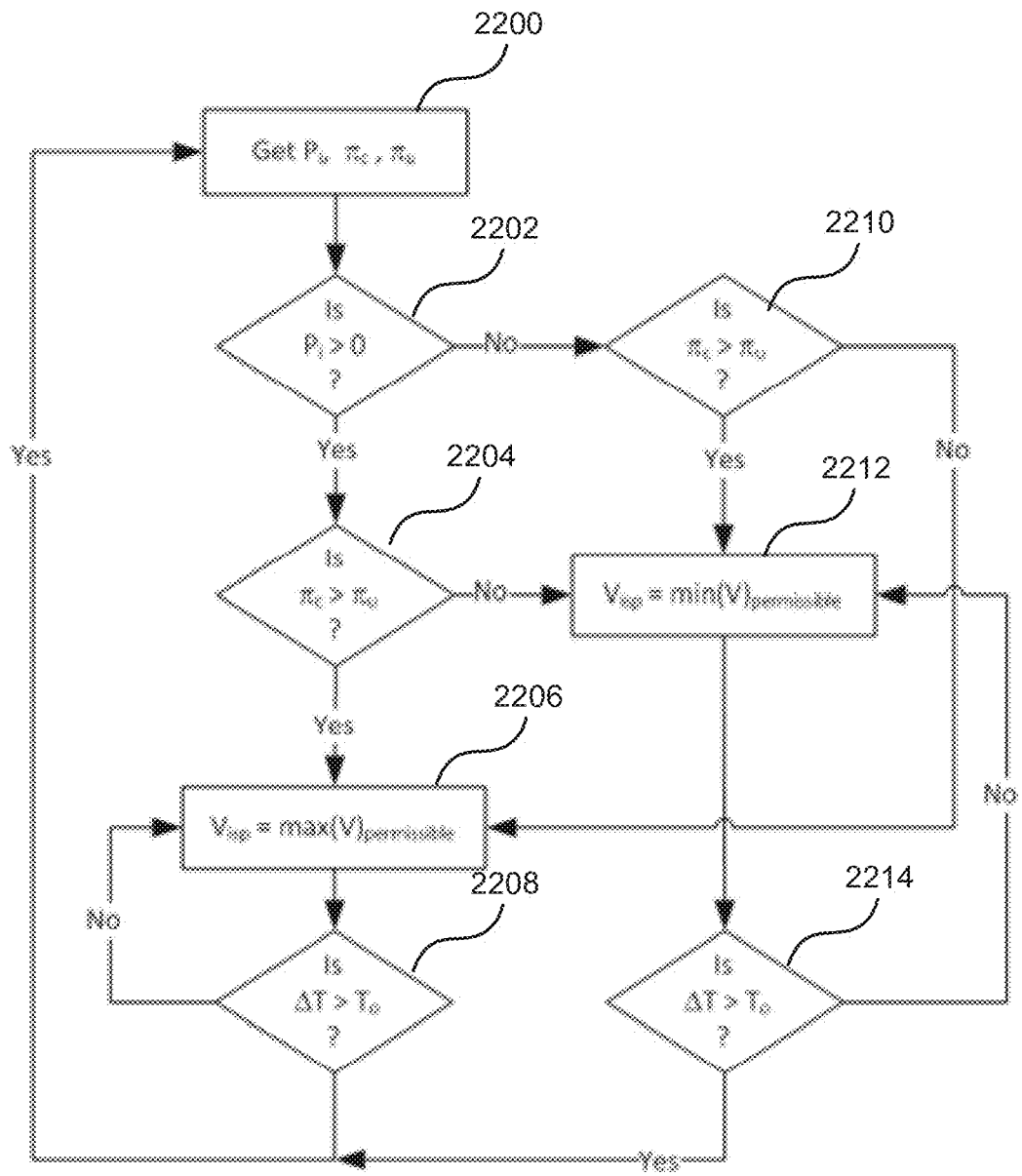
FIG. 22 is a flow chart illustrating example operations performed for controlling voltage via VAR injection in accordance with various embodiments.

FIG. 22 is a flow chart illustrating example operations that may be performed to achieve demand/energy control in accordance with various embodiments. In particular, FIG. 22 illustrates revenue optimization depending on variable price at which electricity is bought from the market, which can be achieved by using solar inverters' VAR control capability without affecting "real power produced from the panels." At any given point in time, if the net power ($P_i$) drawn by the consumer is positive and the price per kWhr ($\pi_c$) that the GEU has agreed upon with the consumer as per the long term contract is higher than the current market price ($\pi_u$), then the solar inverter would inject VARs such that the voltage at the point of connection (Vi) becomes close to maximum permissible voltage e.g. in the US, the maximum permissible voltage is governed by the ANSI standard and has a value 126V.

That is, at operation 2200, the net power, the contracted price, and current market price are obtained. At operation 2202, it is determined whether net power drawn is greater than zero (positive—i.e., power consumed is greater than the (solar) power generated by the consumer). If so, at operation 2004, it is determined whether the (long-term) contracted price is greater than the current market price for power. If the contracted price is greater than the current market price, the solar inverter(s) are used to inject VARs until the maximum permissible voltage is met/is as close as possible to the maximum permissible voltage. At operation 2208, it is determined whether the change in time, ΔT is greater than $T_0$. It should be noted that changing or updating voltage settings for all solar inverters continuously can be impractical, hence a time period to change/update can be determined, e.g., by market rate fluctuations, where $T_0$ can be anywhere from, e.g., 15 minutes to 1 hour. As illustrated, these operations can repeat/continue within time period $T_o$.

Returning to operation 2202, if the net power drawn is not positive, a determination is made at operation 2210 (similar to that in operation 2204) to determine whether the contracted price is greater than the current market price. If so, at operation 2212, a consumer's solar inverter is commanded to absorb VARs such that the voltage at the point of connection Vi becomes as close to the minimum permissible voltage, e.g. in the US, the minimum permissible voltage is governed by the ANSI standard and has a value 114V. If not, the solar inverter(s) are used to inject VARs until the maximum permissible voltage is met/is as close as possible to the maximum permissible voltage. The reverse is true when the net power is exported to the grid. Returning to operation 2204, if the contracted price is less than the current market price, again, a consumer's solar inverter is commanded to absorb VARs such that the voltage at the point of connection Vi becomes as close to the minimum permissible voltage. As also described above, at operation 2214, it is determined whether the change in time, ΔT is greater than $T_0$. Such a method allows the GEU to increase energy consumption and therefore revenue. The revenue earned by the GEU is given by $(\pi_c-\pi_u)P_i\Delta t$.

To summarize, the consumer is incentivized to install a solar PV system because the consumer is able to purchase electricity at a reduced rate as solar production is charged at a lower amount than "regular" electricity. Moreover, the consumer need not pay any upfront cost for the solar PV system, as it is owned and maintained by the GEU. Thus, the consumer can "go green" without making any initial investment.

The GEU is incentivized under the models described herein because the GEU can reap the same benefits as conventional, present-day solar utilities, i.e., it can sell the solar credits, it can meet its solar generation mandates (for instance RPS mandates in the U.S.), it can hedge on the prices of solar energy which could decrease over time and therefore lock "today's" price with a fixed rate of increase every year thereby minimizing the risk of the investment. Further, because the GEU owns the solar inverter and solar panel, it has greater control over the way it manages the load. In conventional systems/models, if an electric utility needs to affect demand control, direct control over a consumer's assets such as air conditioners, water heaters etc., is required. Direct control over loads reduces a consumer's QoS. However, as discussed above, if the GEU owns and controls a solar inverter, it can directly control the demand by plus or minus about two to five percent without any negative impact to QoS. The consumer may not even notice a change in demand.

Further, the GEU can better manage its fleet of distributed solar PV panels by having direct control. That is, the GEU can better control situations that give rise to reverse power flow, controlled ramp rates, reduced voltage volatility, and in general an improved level of grid control. If the GEU starts providing services to a fairly large percentage of customers on a single feeder, it can participate in VVO and other grid control programs. Additionally still, the GEU may take over an entire distribution feeder, can coordinate its solar PV inverters for injecting/absorbing VARs, other VAR sources and the LTC/LVR controls to realize the aforementioned plus or minus about five percent range of control, to maximize profitability. The GEU may export and import power in the ancillary market using the active demand control realized by controlling the solar PV inverters.

The same approach that's used by the GEU to maximize revenue can be used by consumers who are willing to pay the initial upfront cost of installing a solar PV panel and are not interested in a long term contract with the GEU to reduce their energy bills. The consumer has a small range of control over the voltage of their house essentially controlled by the solar PV inverter. In this approach, the solar PV inverter attempts to maximize energy production during the day but keep voltage as low as possible with available (absorbing) VARS, while minimizing voltage throughout the night by using (absorbing) as many VARS as allowed. That is, the consumer generally wants to minimize load consumption and maximize solar production. Thus, the goal of the consumer is to minimize voltage. Generally, at lower voltages everyday loads have lower losses.

Both the above approaches allows the consumer to achieve up to approximately two to ten percent reduction in energy bills just through solar PV inverter-based voltage control. This benefit is achieved all the time (twenty-fours/day and seven days/week) even when the sun is not shining. Accordingly, the consumer can utilize a 4 quadrant solar PV inverter with an appropriate VAR control strategy, and can command it to realize its desired control objectives as described herein.

Figure 23:
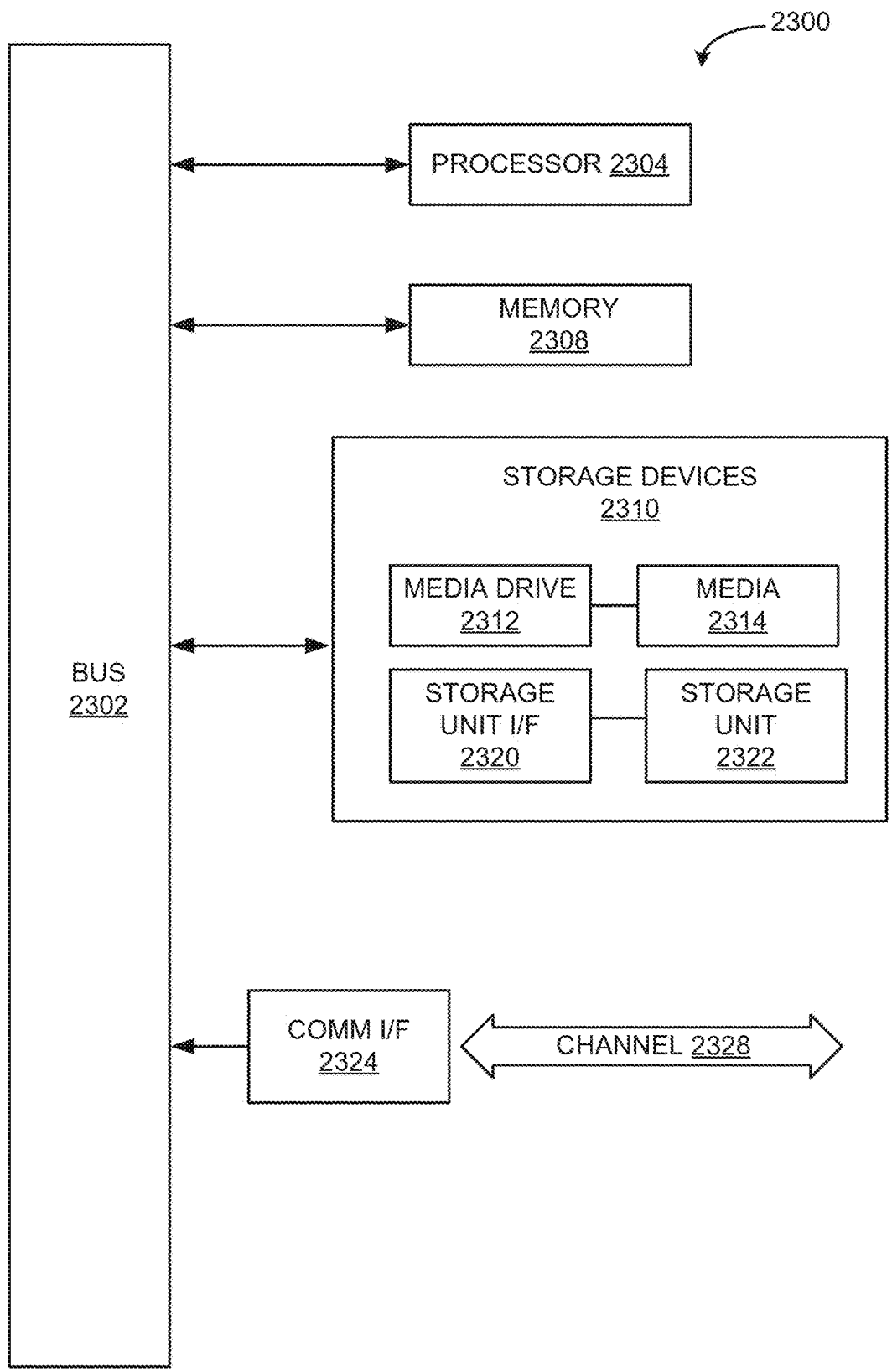
FIG. 23 is a schematic representation of an example computing module that may be used to implement various features of embodiments described in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 23 which may be used to implement various features of the system and methods disclosed herein. Various embodiments are described in terms of this example-computing module 2300. After reading this description, it will become apparent to a person skilled in the relevant art how to implement the application using other computing modules or architectures.

Referring now to FIG. 23, computing module 2300 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. For example, computing module 2300 may be one embodiment of the data acquisition and control module of FIG. 23, a distributed VAR source device, and/or one or more functional elements thereof. Computing module 2300 might also represent computing capabilities embedded within or otherwise available to a given device. For example, a computing module might be found in other electronic devices such as, for example navigation systems, portable computing devices, and other electronic devices that might include some form of processing capability.

Computing module 2300 might include, for example, one or more processors, controllers, control modules, or other processing devices, such as a processor 2304. Processor 2304 might be implemented using a general-purpose or special-purpose processing engine such as, for example, a microprocessor, controller, or other control logic. In the illustrated example, processor 2304 is connected to a bus 2302, although any communication medium can be used to facilitate interaction with other components of computing module 2300 or to communicate externally.

Computing module 2300 might also include one or more memory modules, simply referred to herein as main memory 2308. For example, preferably random access memory (RAM) or other dynamic memory might be used for storing information and instructions to be executed by processor 2304. Main memory 2308 might also be used for storing temporary variables or other intermediate information during execution of instructions to be executed by processor 2304. Computing module 2300 might likewise include a read only memory ("ROM") or other static storage device coupled to bus 2302 for storing static information and instructions for processor 2304.

The computing module 2300 might also include one or more various forms of information storage mechanism 2310, which might include, for example, a media drive 2312 and a storage unit interface 2320. The media drive 2312 might include a drive or other mechanism to support fixed or removable storage media 2314. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 2314 might include, for example, a hard disk, an integrated circuit assembly, magnetic tape, cartridge, optical disk, a CD or DVD, or other fixed or removable medium that is read by, written to or accessed by media drive 2312. As these examples illustrate, the storage media 2314 can include a computer usable storage medium having stored therein computer software or data.

In alternative embodiments, information storage mechanism 2310 might include other similar instrumentalities for allowing computer programs or other instructions or data to be loaded into computing module 2300. Such instrumentalities might include, for example, a fixed or removable storage unit 2322 and an interface 2320. Examples of such storage units 2322 and interfaces 2320 can include a program cartridge and cartridge interface, a removable memory (for example, a flash memory or other removable memory module) and memory slot, a PCMCIA slot and card, and other fixed or removable storage units 2322 and interfaces 2320 that allow software and data to be transferred from the storage unit 2322 to computing module 2300.

Computing module 2300 might also include a communications interface 2324. Communications interface 2324 might be used to allow software and data to be transferred between computing module 2300 and external devices. Examples of communications interface 2324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 2324 might typically be carried on signals, which can be electronic, electromagnetic (which includes optical) or other signals capable of being exchanged by a given communications interface 2324. These signals might be provided to communications interface 2324 via a channel 2328. This channel 2328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 2308, storage unit 2320, media 2314, and channel 2328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 2300 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for voltage and volt ampere reactive (VAR) control of a power system, comprising:
   determining net power drawn at a load at a secondary side of a service transformer at a given time;
   determining a first price associated with power provided by a first utility to the load at the given time;
   determining a second price associated with power provided by at least a second utility to the load at the given time, wherein the first price comprises a contracted price at which power is provided by the first utility to a consumer, and wherein the second price comprises a current market price for power;
   at least one of injecting and absorbing VARs using a VAR source on the secondary side of the service transformer to increase or decrease energy consumption based upon a comparison between the determined net power drawn at the load, the first price, and the second price, such that a voltage at a connection point of the load to the secondary side of the service transformer is between 114V and 126V;
   determining whether the net power drawn at load is positive;
   determining whether the contracted price is greater than the current market price after determining the net power drawn at load is positive, wherein the injection of VARs comprises injecting VARs such that the voltage at the connection point of the load to the secondary side of the service transformer is 126V after determining the contracted price is greater than the current market price, and wherein the absorption of VARs comprises absorbing VARs such that the voltage at the connection point of the load to the secondary side of the service transformer is 126V after determining the contracted price is less than the current market price; and
   determining whether the contracted price is greater than the current market price after determining the net power drawn at load is negative, wherein the absorption of VARs comprises absorbing VARs such that the voltage at the connection point of the load to the secondary side of the service transformer is 126V after determining the contracted price is greater than the current market price, and wherein the injection of VARs comprises injecting VARs such that the voltage at the connection point of the load to the secondary side of the service transformer is 126V after determining the contracted price is less than the current market price.

2. The computer-implemented method of claim 1, wherein the injection of VARs occurs repeatedly in accordance with a time period.

3. The computer-implemented method of claim 1, wherein the injection of VARs is performed with a solar inverter installed and owned by the first utility.

4. The computer-implemented method of claim 1, wherein solar inverter comprises a distributed VAR device operatively connected to a secondary side of a service transformer, has a distributed control algorithm, and implements zero-droop voltage control.

5. The computer-implemented method of claim 1, wherein the net power drawn at the load includes power provided by the first utility and power provided by one or more solar photovoltaic panels installed at a consumer location.

6. A system, comprising:
   at least one load distributed along and receiving power from a feeder of a power grid; and
   a solar power system installed at the at least one load, wherein the solar power system generates solar power, and wherein an inverter of the solar power system is configured to at least one of inject and absorb VARs to increase or decrease energy consumption based upon a comparison between a determined net power drawn at the at least one load, a contracted price for the received power, and a current market price for power at the at least one load, such that a voltage at a connection point of the load to the secondary side of a service transformer is between 114V and 126V;
   wherein if the determined net power drawn is positive,
      the injection of VARs comprises injecting VARs such that the voltage at the connection point of the load to the secondary side of the service transformer is 126V if the contracted price is greater than the current market price, and wherein the absorption of VARs comprises absorbing VARs such that the voltage at the connection point of the load to the secondary side of the service transformer is 126V if the contracted price is less than the current market price; and
   wherein if the determining net power drawn is negative,
      the absorption of VARs comprises absorbing VARs such that the voltage at the connection point of the load to the secondary side of the service transformer is 126V if the contracted price is greater than the current market price, and wherein the injection of VARs comprises injecting VARs such that the voltage at the connection point of the load to the secondary side of the service transformer is 126V if the contracted price is less than the current market price.

7. The system of claim 6, wherein the inverter comprises a distributed VAR device which operates utilizing a distributed control algorithm and implements zero-droop voltage control.

8. The system of claim 6, wherein the net power drawn at the load includes power provided by utility purchased from a wholesale electricity market and sold to a consumer at the contracted price and power provided by the solar power system installed by the utility at the at least one load.

* * * * *